US010014887B1

(12) United States Patent
Gharavi et al.

(10) Patent No.: US 10,014,887 B1
(45) Date of Patent: Jul. 3, 2018

(54) OUTPHASING TRANSMITTERS WITH IMPROVED WIRELESS TRANSMISSION PERFORMANCE AND MANUFACTURABILITY

(71) Applicant: Movandi Corporation, Newport Beach, CA (US)

(72) Inventors: Sam Gharavi, Irvine, CA (US); Ahmadreza Rofougaran, Newport Coast, CA (US); Maryam Rofougaran, Rancho Palos Verdes, CA (US); Farid Shirinfar, Granada Hills, CA (US)

(73) Assignee: Movandi Corporation, Newport Beach, CA (US)

( * ) Notice: Subject to any disclaimer, the term of this patent is extended or adjusted under 35 U.S.C. 154(b) by 0 days.

(21) Appl. No.: 15/432,091

(22) Filed: Feb. 14, 2017

(51) Int. Cl.
*H04K 1/02* (2006.01)
*H04B 1/04* (2006.01)
*H04B 7/10* (2017.01)

(52) U.S. Cl.
CPC ............... *H04B 1/04* (2013.01); *H04B 7/10* (2013.01); *H04B 2001/0416* (2013.01)

(58) Field of Classification Search
CPC .... H04B 1/04; H04B 7/10; H04B 2001/0416; H03F 1/3247; H03F 3/24; H03F 1/3241; H03G 3/3042; H04L 27/368; H04L 1/0003; H04L 1/0071; H04L 5/0007; H04L 1/0009; H04L 27/0008
USPC ................................ 375/297, 295, 316, 219
See application file for complete search history.

(56) References Cited

U.S. PATENT DOCUMENTS

| 6,307,502 | B1 | 10/2001 | Marti-Canales | |
|---|---|---|---|---|
| 8,482,462 | B2 | 7/2013 | Komijani | |
| 2010/0149039 | A1* | 6/2010 | Komijani | H04B 7/0617 342/377 |
| 2014/0035731 | A1 | 2/2014 | Chan | |
| 2015/0341098 | A1* | 11/2015 | Angeletti | H01Q 3/40 375/267 |

OTHER PUBLICATIONS

Baggett, Benjamin M. W. *Optimization of Aperiodically Spaced Phased Arrays for Wideband Applications*. MS Thesis. Virginia Polytechnic Institute and State University, 2011. pp. 1-137.

\* cited by examiner

*Primary Examiner* — Zewdu Kassa
(74) *Attorney, Agent, or Firm* — Farajami & Farajami LLP

(57) ABSTRACT

An outphasing transmitter includes a decomposition block, first and second power amplifiers, and antennas in a phased array antenna panel. The decomposition block decomposes a composite input signal into first and second decomposed radio frequency (RF) signals. The first and second decomposed RF signals are coupled to the first and second power amplifiers respectively. First and second non-overlapping sub-arrays of the antennas may be uniquely associated with the first and second power amplifiers respectively. Alternatively, first and second groups of interleaved antenna rows may be uniquely associated with the first and second power amplifiers respectively. Alternatively, first and second random pluralities of the antennas may be randomly hard-wired to the first and second power amplifiers respectively. Alternatively, first and second pluralities of the antennas may be dynamically and selectably assigned to the first and second power amplifiers respectively.

16 Claims, 12 Drawing Sheets

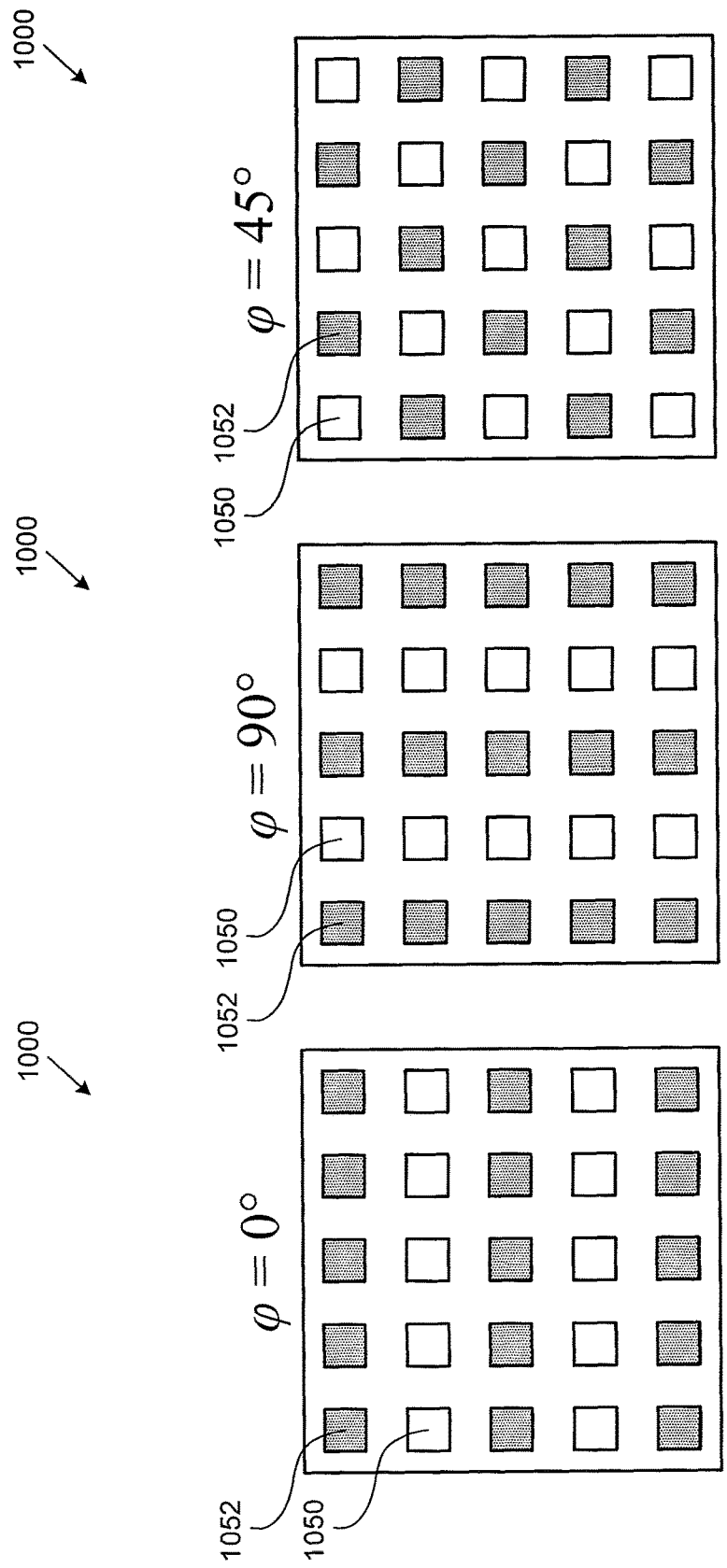

1100

| $\theta$ | $\varphi$ | ANTENNA ASSIGNMENTS |
|---|---|---|
| $\theta_i$ | $\varphi_l$ | S1, S1, S2, S2, S2, . . . S1 |
|  | $\varphi_m$ | S1, S1, S1, S2, S2, . . . S2 |
|  | $\varphi_n$ | S1, S1, S1, S1, S2, . . . S2 |
|  | ⋮ | ⋮ |
| $\theta_j$ | $\varphi_l$ | S2, S2, S2, S1, S2, . . . S2 |
|  | $\varphi_m$ | S2, S1, S2, S2, S1, . . . S1 |
|  | $\varphi_n$ | S2, S2, S1, S2, S2, . . . S2 |
|  | ⋮ | ⋮ |
| $\theta_k$ | $\varphi_l$ | S2, S1, S1, S1, S2, . . . S1 |
|  | $\varphi_m$ | S1, S2, S1, S1, S2, . . . S1 |
|  | $\varphi_n$ | S2, S2, S1, S1, S1, . . . S2 |
|  | ⋮ | ⋮ |

Fig. 11

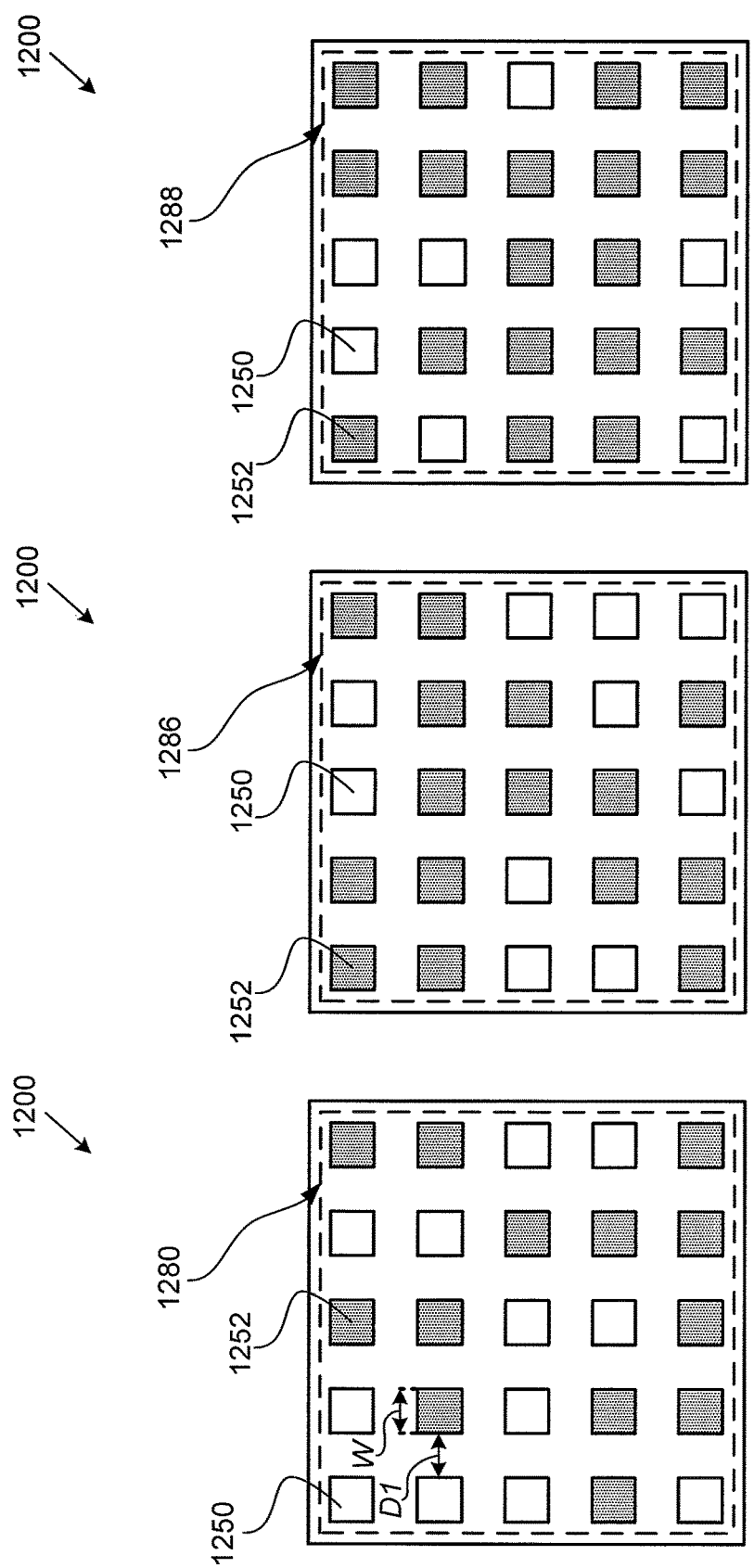

OUTPHASING TRANSMITTERS WITH IMPROVED WIRELESS TRANSMISSION PERFORMANCE AND MANUFACTURABILITY

RELATED APPLICATION(S)

The present application is related to U.S. patent application Ser. No. 15/225,071, filed on Aug. 1, 2016, and titled "Wireless Receiver with Axial Ratio and Cross-Polarization Calibration," and U.S. patent application Ser. No. 15/225,523, filed on Aug. 1, 2016, and titled "Wireless Receiver with Tracking Using Location, Heading, and Motion Sensors and Adaptive Power Detection," and U.S. patent application Ser. No. 15/226,785, filed on Aug. 2, 2016, and titled "Large Scale Integration and Control of Antennas with Master Chip and Front End Chips on a Single Antenna Panel," and U.S. patent application Ser. No. 15/255,656, filed on Sep. 2, 2016, and titled "Novel Antenna Arrangements and Routing Configurations in Large Scale Integration of Antennas with Front End Chips in a Wireless Receiver," and U.S. patent application Ser. No. 15/256,038 filed on Sep. 2, 2016, and titled "Transceiver Using Novel Phased Array Antenna Panel for Concurrently Transmitting and Receiving Wireless Signals," and U.S. patent application Ser. No. 15/256,222 filed on Sep. 2, 2016, and titled "Wireless Transceiver Having Receive Antennas and Transmit Antennas with Orthogonal Polarizations in a Phased Array Antenna Panel," and U.S. patent application Ser. No. 15/278,970 filed on Sep. 28, 2016, and titled "Low-Cost and Low-Loss Phased Array Antenna Panel," and U.S. patent application Ser. No. 15/279,171 filed on Sep. 28, 2016, and titled "Phased Array Antenna Panel Having Cavities with RF Shields for Antenna Probes," and U.S. patent application Ser. No. 15/279,219 filed on Sep. 28, 2016, and titled "Phased Array Antenna Panel Having Quad Split Cavities Dedicated to Vertical-Polarization and Horizontal-Polarization Antenna Probes," and U.S. patent application Ser. No. 15/335,034 filed on Oct. 26, 2016, and titled "Lens-Enhanced Phased Array Antenna Panel," and U.S. patent application Ser. No. 15/335,179 filed on Oct. 26, 2016, and titled "Phased Array Antenna Panel with Configurable Slanted Antenna Rows," and U.S. patent application Ser. No. 15/355,967 filed on Nov. 18, 2016, and titled "Phased Array Antenna Panel with Enhanced Isolation and Reduced Loss," and U.S. patent application Ser. No. 15/356,172 filed on Nov. 18, 2016, and titled "Phased Array Antenna Panel Having Reduced Passive Loss of Received Signals," and U.S. patent application Ser. No. 15/432,018 filed on Feb. 14, 2017, and titled "Outphasing Transmit and Receive Wireless Systems Having Dual-Polarized Antennas." The disclosures of all of these related applications are hereby incorporated fully by reference into the present application.

BACKGROUND

Wireless transmitters utilizing phased array antenna panels employ a large number of power amplifiers to amplify radio frequency (RF) signals to transmit directed RF beams. Amplifying RF signals with time-varying amplitude (also referred to as "variable envelope signals") is not as power efficient as amplifying RF signals with constant amplitude (also referred to as "constant envelope signals"). Moreover, power amplifiers utilized to amplify and transmit constant envelope signals are less non-linear and introduce less distortion as compared to power amplifiers utilized to amplify and transmit variable envelope signals. On the other hand, communicating using RF signals with time-varying amplitude is more spectral efficient than communicating using RF signals with constant amplitude.

In one solution, a variable amplitude signal is decomposed into two constant amplitude signals, and the two constant amplitude signals are amplified using two separate power amplifiers. The two constant amplitude signals are then transmitted over the air by respective antennas. One shortcoming of this solution is that path differences of the two constant amplitude signals will increase the error vector magnitude (EVM). Additionally, particularly in high-frequency applications, phased array antenna panels may transmit RF beams in unintended directions (also referred to as "grating lobes"), interfering with proper reception of intended RF beams.

Thus, there is a need in the art to use phased array antenna panels having constant amplitude decomposed RF signals to achieve a transmitter and a wireless communication system that overcome the deficiencies in the art.

SUMMARY

The present disclosure is directed to outphasing transmitters with improved wireless transmission performance and manufacturability, substantially as shown in and/or described in connection with at least one of the figures, and as set forth in the claims.

BRIEF DESCRIPTION OF THE DRAWINGS

FIGS. 10A, 10B, and 10C illustrate layout diagrams of a portion of an exemplary phased array antenna panel according to one implementation of the present application.

FIG. 11 illustrates an exemplary lookup table according to one implementation of the present application.

FIGS. 12A, 12B, and 12C illustrate layout diagrams of a portion of an exemplary phased array antenna panel according to one implementation of the present application.

DETAILED DESCRIPTION

Figure 1A:
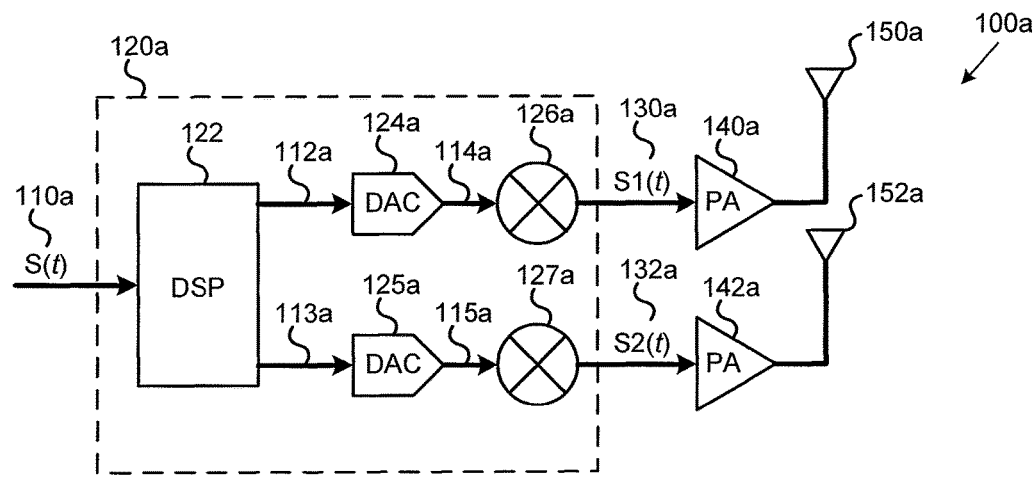
FIGS. 1A and 1B illustrate an exemplary system diagram of a portion of an exemplary outphasing transmitter according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1A illustrates an exemplary system diagram of a portion of an exemplary outphasing transmitter according to one implementation of the present application. As illustrated in FIG. 1A, outphasing transmitter 100a includes decomposition block 120a, having digital signal processor (DSP) 122, digital-to-analog converters (DACs) 124a and 125a, and mixers 126a and 127a, power amplifiers 140a and 142a, and antennas 150a and 152a.

As illustrated in FIG. 1A, composite input signal 110a is provided to decomposition block 120a. Composite input signal 110a is generally an amplitude and phase modulated signal. Composite input signal 110a may be provided by a modem (not shown in FIG. 1A). In one implementation, an RF front end chip may include components of outphasing transmitter 100a, such as decomposition block 120a and power amplifiers 140a and 142a. In one implementation, a single RF front end chip may be associated with two antennas, such as antennas 150a and 152a. In various implementations, a single RF front end chip may be associated with four, six, eight, sixteen, or any number of antennas. Various examples of association of RF front end chips with different numbers and arrangements of antennas is described in U.S. patent application Ser. No. 15/255,656 filed on Sep. 2, 2016, and titled "Novel Antenna Arrangements and Routing Configurations in Large Scale Integration of Antennas with Front End Chips in a Wireless Receiver." The disclosure in this related application is hereby incorporated fully by reference into the present application.

In the present implementation, composite input signal 110a is a variable envelope signal defined by S(t) 110 in equation (1) below:

$$S(t)e^{j\omega t} = A(t)e^{j\omega t + j\beta(t)} \quad \text{Equation (1)}$$

where S(t) represents the composite input signal, and A(t) represents the variable envelope.

As shown in FIG. 1A, decomposition block 120a is configured to decompose variable amplitude (or variable envelope) composite input signal 110a into constant amplitude (or constant envelope) decomposed RF signals 130a and 132a. In decomposition block 120a, DSP 122 decomposes variable amplitude composite input signal 110a into constant amplitude decomposed digital signals 112a and 113a. DSP 122 may be implemented, for example, using a field-programmable gate array (FPGA) chip. DSP 122 is coupled to DACs 124a and 125a. DACs 124a and 125a convert the constant amplitude decomposed digital signals 112a and 113a into constant amplitude decomposed analog signals 114a and 115a respectively. DACs 124a and 125a are coupled to mixers 126a and 127a respectively. Mixers 126a and 127a upconvert the constant amplitude decomposed analog signals 114a and 115a into constant amplitude decomposed RF signals 130a and 132a. Decomposition block 120a outputs constant amplitude decomposed RF signals 130a and 132a. Decomposition block 120a may include additional components, such as additional signal conditioning circuitry such as phase shifters or time delays.

In the present implementation, decomposed RF signals 130a and 132a are constant amplitude RF signals defined by respective constant amplitude components S1(t) 130 and S2(t) 132 in equation (2) below.

$$S(t)e^{j\omega t} = A(t)e^{j\omega t + j\beta(t)} = \underbrace{A_0 e^{j\omega t + j\beta(t) + j\alpha(t)}}_{S1(t)e^{j\omega t}} + \underbrace{A_0 e^{j\omega t + j\beta(t) - j\alpha(t)}}_{S2(t)e^{j\omega t}} \quad \text{Equation (2)}$$

where S1(t) and S2(t) represent the decomposed RF signals, $A_0$ represents the constant amplitude (or constant envelope) of S1(t) and S2(t), and $e^{j\omega t + j\beta(t) + j\alpha(t)}$ and $e^{j\omega t + j\beta(t) - j\alpha(t)}$ represent the variable phase information using the two variables β and α. Further details regarding decomposition of a variable amplitude signal into constant amplitude signals (also referred to as "outphasing") can be found in U.S. Pat. No. 8,482,462 issued to Komijani et al., which is fully incorporated herein by reference.

As illustrated in FIG. 1A, decomposition block 120a is coupled to power amplifiers 140a and 142a. Power amplifiers 140a and 142a amplify constant amplitude decomposed RF signals 130a and 132a respectively. Power amplifiers 140a and 142a can be placed sufficiently apart from each other and provided respective RF shields so as to minimize any inter-modulation or interference between these two power amplifiers.

In the present implementation, power amplifiers 140a and 142a are coupled to antennas 150a and 152a respectively. In an alternative implementation, power amplifiers 140a and 142a may be respectively coupled to a vertically-polarized probe and a horizontally-polarized probe of a dual-polarized antenna. Antennas 150a and 152a may be, for example, patch antennas, dipole antennas, or slot antennas. Antennas 150a and 152a may be part of a phased array antenna panel (not shown in FIG. 1A). In practice, for example when used in conjunction with 5G wireless communications (5th generation mobile networks or 5th generation wireless systems), a phased array antenna panel may have one hundred and forty four (144) antennas. When used in conjunction with commercial geostationary communication satellites or low earth orbit satellites, a phased array antenna panel may be even larger, and have, for example, four hundred (400) antennas. In other examples, a phased array antenna panel may have any other number of antennas. In one implementation, a single power amplifier 140a (or 142a) is coupled to a single antenna 150a (or 152a). In various implementations, a single power amplifier 140a (or 142a) may be coupled to four, six, eight, sixteen, or any number of antennas 150a or (152a). For example, power amplifier 140a (or 142a) may be coupled to a plurality of antennas 150a or (152a), using, for example, a splitter, a plurality of amplifier cells, or other suitable means. Thus, antennas 150a or (152a) may transmit amplified constant amplitude decomposed RF signal 130a (or 132a).

By decomposing variable amplitude composite input signal 110a into constant amplitude decomposed RF signals 130a and 132a prior to their amplification, power amplifiers 140a and 142a operate with more power efficiency. Moreover, power amplifiers 140a and 142a exhibit less non-linearity and introduce less distortion than would a power amplifier utilized to amplify variable amplitude composite signal 110a without decomposition. In addition, a combiner is not used in outphasing transmitter 100a, and does not cause loss or inter-modulation between power amplifiers 140a and 142a. Thus, outphasing transmitter 100a efficiently transmits constant amplitude decomposed RF signal 130a using antenna 150a, and efficiently transmits constant amplitude decomposed RF signal 132a using antenna 152a.

Figure 1B:
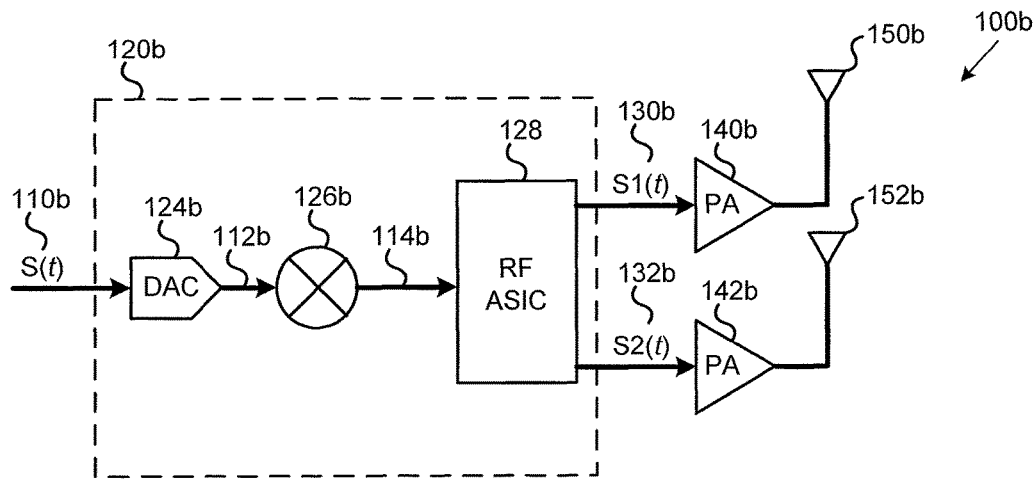

FIG. 1B illustrates an exemplary system diagram of a portion of an exemplary outphasing transmitter according to one implementation of the present application. As illustrated in FIG. 1B, outphasing transmitter 100b includes decomposition block 120b, having, DAC 124b, mixer 126b, and RF application-specific integrated circuit (RF ASIC) 128, power amplifiers 140b and 142b, and antennas 150b and 152b.

As illustrated in FIG. 1B, composite input signal 110b is provided to decomposition block 120b. Composite input signal 110b is generally an amplitude and phase modulated signal. Composite input signal 110b may be provided by a modem (not shown in FIG. 1B). In one implementation, an RF front end chip may include components of outphasing transmitter 100b, such as decomposition block 120b and power amplifiers 140b and 142b. In one implementation, a single RF front end chip may be associated with two antennas, such as antennas 150b and 152b. In various implementations, a single RF front end chip may be associated with four, six, eight, sixteen, or any number of antennas. Various examples of association of RF front end chips with different numbers and arrangements of antennas is described in U.S. patent application Ser. No. 15/255,656 filed on Sep. 2, 2016, and titled "Novel Antenna Arrangements and Routing Configurations in Large Scale Integration of Antennas with Front End Chips in a Wireless Receiver." The disclosure in this related application is hereby incorporated fully by reference into the present application.

In the present implementation, composite input signal 110b is a variable envelope signal defined by S(t) 110 in equation (1) above. As shown in FIG. 1B, decomposition block 120b is configured to decompose variable amplitude (or variable envelope) composite input signal 110b into constant amplitude (or constant envelope) decomposed RF signals 130b and 132b. In decomposition block 120b, DAC 124b converts variable amplitude composite input signal 110b into variable amplitude analog signal 112b. DAC 124b is coupled to mixer 126b. Mixer 126b upconverts variable amplitude analog signal 112b into variable amplitude RF signal 114b. Mixer 126b is coupled to RF ASIC 128. RF ASIC 128 decomposes variable amplitude RF signal 114b into constant amplitude decomposed RF signals 130b and 132b. Decomposition block 120b outputs constant amplitude decomposed RF signals 130b and 132b. Decomposition block 120b may include additional components, such as additional signal conditioning circuitry, for example, a phase shifter or a time delay. In the present implementation, decomposed RF signals 130b and 132b are constant amplitude RF signals defined by respective constant amplitude components S1(t) 130 and S2(t) 132 in equation (2) above.

As illustrated in FIG. 1B, decomposition block 120b is coupled to power amplifiers 140b and 142b. Power amplifiers 140b and 142b amplify constant amplitude decomposed RF signals 130b and 132b respectively. Power amplifiers 140b and 142b can be placed sufficiently apart from each other and provided respective RF shields so as to minimize any inter-modulation or interference between these two power amplifiers.

In the present implementation, power amplifiers 140b and 142b are coupled to antennas 150b and 152b respectively. In an alternative implementation, power amplifiers 140b and 142b may be respectively coupled to a vertically-polarized probe and a horizontally-polarized probe of a dual-polarized antenna. Antennas 150b and 152b may be, for example, patch antennas, dipole antennas, or slot antennas. Antennas 150b and 152b may be part of a phased array antenna panel (not shown in FIG. 1B). In practice, for example when used in conjunction with 5G wireless communications (5th generation mobile networks or 5th generation wireless systems), a phased array antenna panel may have one hundred and forty four (144) antennas. When used in conjunction with commercial geostationary communication satellites or low earth orbit satellites, a phased array antenna panel may be even larger, and have, for example, four hundred (400) antennas. In other examples, a phased array antenna panel may have any other number of antennas. In one implementation, a single power amplifier 140b (or 142b) is coupled to a single antenna 150b (or 152b). In various implementations, a single power amplifier 140b (or 142b) may be coupled to four, six, eight, sixteen, or any number of antennas 150b or (152b). For example, power amplifier 140b (or 142b) may be coupled to a plurality of antennas 150b or (152b), using, for example, a splitter, a plurality of amplifier cells, or other suitable means. Thus, antennas 150b or (152b) may transmit amplified constant amplitude decomposed RF signal 130b (or 132b).

By decomposing variable amplitude composite input signal 110b into constant amplitude decomposed RF signals 130b and 132b prior to their amplification, power amplifiers 140b and 142b operate with more power efficiency. Moreover, power amplifiers 140b and 142b exhibit less non-linearity and introduce less distortion than would a power amplifier utilized to amplify variable amplitude composite signal 110b without decomposition. In addition, a combiner is not used in outphasing transmitter 100b, and does not cause loss or inter-modulation between power amplifiers 140b and 142b. Thus, outphasing transmitter 100b efficiently transmits constant amplitude decomposed RF signal 130b using antenna 150b, and efficiently transmits constant amplitude decomposed RF signal 132b using antenna 152b.

Figure 2A:
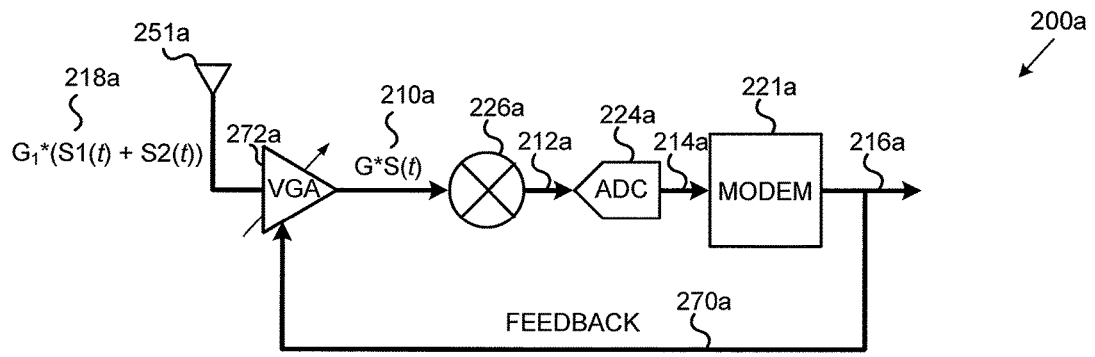
FIGS. 2A and 2B illustrate an exemplary system diagram of a portion of an exemplary receiver according to one implementation of the present application.

FIG. 2A illustrates an exemplary system diagram of a portion of an exemplary receiver according to one implementation of the present application. As illustrated in FIG. 2A, receiver 200a includes antenna 251a, variable-gain amplifier (VGA) 272a, mixer 226a, analog-to-digital converter (ADC) 224a, modem 221a, output digital signal 216a, and feedback line 270a.

Receiver 200a in FIG. 2A can be used in conjunction with outphasing transmitter 100a of FIG. 1A or outphasing transmitter 100b of FIG. 1B. In the present implementation, constant amplitude decomposed RF signals 130a and 132a (or 130b and 132b) transmitted by respective antennas 150a and 152a (or 150b and 152b) of outphasing transmitter 100a (or 100b) combine over the air through superposition. Thus, a single antenna 251a of receiver 200a receives a variable amplitude composite RF signal that corresponds to the original variable amplitude composite input signal 110a (or

110*b*). More specifically, antenna 251*a* receives variable amplitude composite RF signal, defined by $G_1^*(S1(t)+S2(t))$ 218*a*, where $G_1$ is a gain at antenna 251*a*. Antenna 251*a* may be, for example, a patch antenna, a dipole antenna, or a slot antenna. In one implementation, receiver 200*a* may include a dual-polarized antenna having a vertically-polarized probe and a horizontally-polarized probe.

As illustrated in FIG. 2A, antenna 251*a* is coupled to VGA 272*a*. VGA 272*a* amplifies variable amplitude composite RF signal 218*a* into a scaled variable amplitude composite RF signal, defined by $G^*S(t)$ 210*a*. VGA 272*a* is coupled to mixer 226*a*. Mixer 226*a* downconverts scaled variable amplitude composite RF signal 210*a* into scaled variable amplitude composite analog signal 212*a*. Mixer 226*a* is coupled to ADC 224*a*. ADC 224*a* converts scaled variable amplitude composite analog signal 212*a* into scaled variable amplitude composite digital signal 214*a*. ADC 224*a* is coupled to modem 221*a*. Modem 221*a* produces an output digital signal 216*a* based on scaled variable amplitude composite digital signal 214*a*. In one implementation, an RF front end chip in a phased array antenna panel may include components of receiver 200*a*, such as VGA 272*a*, mixer 226*a*, ADC 224*a*, and modem 221*a*. Components of receiver 200*a* may be coupled in an order other than the order described herein. Receiver 200*a* may include additional components, such as additional signal conditioning circuitry.

As further illustrated in FIG. 2A, modem 221*a* is coupled to feedback line 270*a*. Different paths taken by constant amplitude decomposed RF signals, such as different paths taken by decomposed RF signals 130*a* and 132*a* (or 130*b* and 132*b*), can cause imbalance in both gain and phase, and result in an increased bit error rate (BER) for the output digital signal 216*a* at the receiver. Receiver 200*a* can apply gain and phase adjustment to variable amplitude composite RF signal 218*a* using feedback line 270*a* in order to compensate for such imbalance. For example, as show in FIG. 2A, antenna 251*a* is coupled to VGA 272*a* and variable amplitude composite RF signal 218*a* is input to VGA 272*a*. Feedback line 270*a* couples modem 221*a* to VGA 272*a*. Feedback line 270*a* uses the BER as feedback to adjust the gain of VGA 272*a* to compensate for gain imbalance and decrease the BER. Feedback line 270*a* may include additional components, such as phase adjustment circuitry.

Figure 2B:
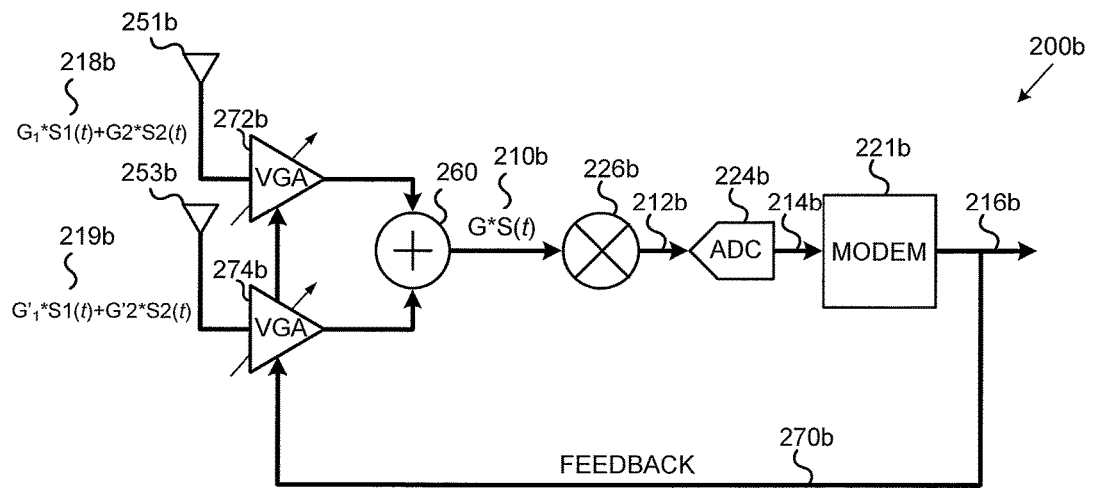

FIG. 2B illustrates an exemplary system diagram of a portion of an exemplary receiver according to one implementation of the present application. As illustrated in FIG. 2B, receiver 200*b* includes antennas 251*b* and 253*b*, VGAs 272*b* and 274*b*, combiner 260, mixer 226*b*, ADC 224*b*, modem 221*b*, output digital signal 216*b*, and feedback line 270*b*.

Receiver 200*b* in FIG. 2B can be used in conjunction with outphasing transmitter 100*a* of FIG. 1A or outphasing transmitter 100*b* of FIG. 1B. In the present implementation, constant amplitude decomposed RF signals 130*a* and 132*a* (or 130*b* and 132*b*) transmitted by respective antennas 150*a* and 152*a* (or 150*b* and 152*b*) of outphasing transmitter 100*a* (or 100*b*) combine over the air through superposition. Antennas 251*b* and 253*b* of receiver 200*b* each receive a variable amplitude composite RF signal that corresponds to the original variable amplitude composite input signal 110*a* (or 110*b*). More specifically, antennas 251*b* and 253*b* receive variable amplitude composite RF signals, defined by $G_1^*S1(t)+G_2^*S2(t)$ 218*b* and $G'_1^*S1(t)+G'_2^*S2(t)$ 219*b* respectively, where $G_1$, $G_2$, $G'_1$, and $G'_2$ are gains at antennas 251*b* and 253*b* respectively. Antennas 251*b* and 253*b* may be, for example, patch antennas, dipole antennas, or slot antennas. In one implementation, receiver 200*b* may include dual-polarized antennas having vertically-polarized probes and horizontally-polarized probes.

As illustrated in FIG. 2B, antennas 251*b* and 253*b* are coupled to combiner 260 through VGAs 272*b* and 274*b* respectively. VGAs 272*a* and 274*b* amplify variable amplitude composite RF signals 218*b* and 219*b* respectively, and combiner 260 combines variable amplitude composite RF signals 218*b* and 219*b* into a scaled variable amplitude composite RF signal, defined by $G^*S(t)$ 210*b*. Antennas 251*b* and 253*b* may be part of a phased array antenna panel (not shown in FIG. 2B) that may have any other number of antennas, as stated above. In various implementations, combiner 260 may combine variable amplitude composite RF signals from four, six, eight, sixteen, or any number of antennas.

Combiner 260 is coupled to mixer 226*b*. Mixer 226*b* downconverts scaled variable amplitude composite RF signal 210*b* into scaled variable amplitude composite analog signal 212*b*. Mixer 226*b* is coupled to ADC 224*b*. ADC 224*b* converts scaled variable amplitude composite analog signal 212*b* into scaled variable amplitude composite digital signal 214*b*. ADC 224*b* is coupled to modem 221*b*. Modem 221*b* produces an output digital signal 216*b* based on scaled variable amplitude composite digital signal 214*b*. In one implementation, an RF front end chip in a phased array antenna panel may include components of receiver 200*b*, such as VGA 272*b*, mixer 226*b*, ADC 224*b*, and modem 221*b*. Components of receiver 200*b* may be coupled in an order other than the order described herein. Receiver 200*b* may include additional components, such as additional signal conditioning circuitry.

As further illustrated in FIG. 2B, modem 221*b* is coupled to feedback line 270*b*. Different paths taken by constant amplitude decomposed RF signals, such as different paths taken by decomposed RF signals 130*a* and 132*a* (or 130*b* and 132*b*), can cause imbalance in both gain and phase, and result in an increased bit error rate (BER) for the output digital signal 216*b* at the receiver. Receiver 200*b* can apply gain and phase adjustment to variable amplitude composite RF signals 218*b* and 219*b* using feedback line 270*a* in order to compensate for such imbalance. For example, as show in FIG. 2B, antennas 251*b* and 253*b* are coupled to VGAs 272*b* and 274*b* respectively and variable amplitude composite RF signals 218*b* and 219*b* are input to VGAs 272*b* and 274*b* respectively. Feedback line 270*b* couples modem 221*b* to VGAs 272*b* and 274*b*. Feedback line 270*b* uses the BER as feedback to adjust the gain of VGAs 272*b* and 274*b* to compensate for gain imbalance and decrease the BER. Feedback line 270*b* may include additional components, such as phase adjustment circuitry.

Figure 3A:
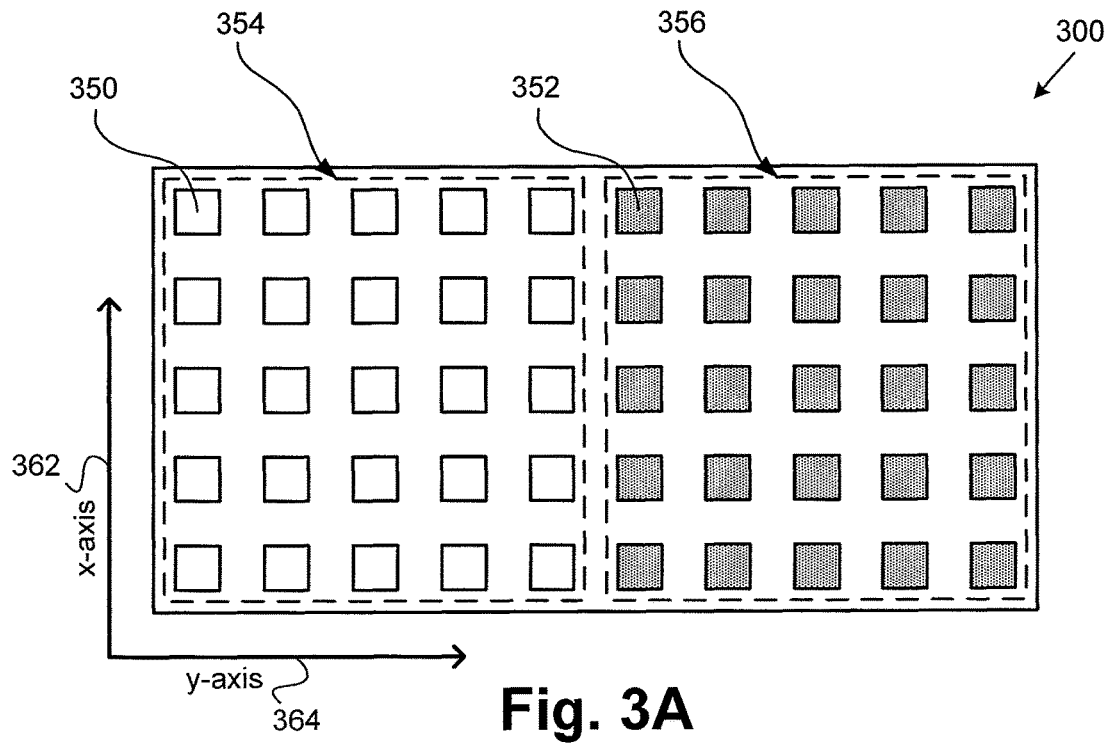
FIG. 3A illustrates a layout diagram of a portion of an exemplary phased array antenna panel according to one implementation of the present application.

FIG. 3A illustrates a layout diagram of a portion of an exemplary phased array antenna panel according to one implementation of the present application. As illustrated in FIG. 3A, phased array antenna panel 300 includes a plurality of antennas 350 (unshaded in the drawings) and a plurality of antennas 352 (shaded in the drawings). In the present implementation, antennas 350 and 352 have a square shape and are arranged in a grid pattern in phased array antenna panel 300. In one implementation, the distance between one antenna and an adjacent antenna is a fixed distance, such as a quarter wavelength (i.e., $\lambda/4$). Although FIG. 3A shows fifty (50) antennas 350 and 352, only a portion of phased array antenna panel 300 is shown in FIG. 3A. In practice, for example when used in conjunction with 5G wireless communications (5th generation mobile networks or 5th generation wireless systems), phased array antenna panel 300 may be much larger, and may have one hundred and forty four (144) antennas 350 and 352, arranged, for example, in a twelve (12) by twelve (12) grid pattern. When used in conjunction with commercial geostationary communication satellites or low earth orbit satellites, phased array antenna panel 300 may be even larger, and have, for example, four hundred (400) antennas 350 and 352. In other examples, phased array antenna panel 300 may have any other number of antennas 350 and 352. In one implementation, antennas 350 and 352 may have a shape other than a square, such as a circle. In practice, antenna probes (not shown in FIG. 3A) may be situated in or over cubical or cylindrical cavities that accommodate more efficient transmission or reception of RF signals. Thus, antenna elements 350 and 352 in FIG. 3A may represent a top view of a cubical cavity housing antenna probes. Examples of various antennas that can be used in various implementations of the present application are shown and described in U.S. patent application Ser. No. 15/278,970 filed on Sep. 28, 2016 and titled "Low-Cost and Low-Loss Phased Array Antenna Panel," and U.S. patent application Ser. No. 15/279,171 filed on Sep. 28, 2016 and titled "Phased Array Antenna Panel Having Cavities with RF Shields for Antenna Probes." The disclosures in these related applications are hereby incorporated fully by reference into the present application. In one implementation, antennas 350 and 352 may be arranged in a pattern other than a grid. In one implementation, the distance between one antenna and an adjacent antenna may be greater than a quarter wavelength (i.e., greater than $\lambda/4$).

In the present implementation, phased array antenna panel 300 is a flat panel array lying in the xy-plane, defined by x-axis 362 and y-axis 364, employing antennas 350 and 352 coupled to associated active circuits to form a beam for transmission. In one implementation, the beam is formed fully electronically by means of phase and amplitude control circuits associated with antennas 350 and 352. An example of beam forming using phase and amplitude control circuits utilizing dual-polarized antennas is described in U.S. patent application Ser. No. 15/226,785 filed on Aug. 2, 2016, and titled "Large Scale Integration and Control of Antennas with Master Chip and Front End Chips on a Single Antenna Panel." The disclosure in this related application is hereby incorporated fully by reference into the present application. Thus, phased array antenna panel 300 can provide fully electronic beamforming without the use of mechanical parts.

Phased array antenna panel 300 in FIG. 3A may be used as part of an outphasing transmitter, such as outphasing transmitter 100a of FIG. 1A or outphasing transmitter 100b of FIG. 1B. Any of antennas 350 in FIG. 3A generally corresponds to antenna 150a (or 150b), and any of antennas 352 in FIG. 3A generally corresponds to antenna 152a (or 152b). In one implementation, a single power amplifier 140a (or 140b) is coupled to a single one of antennas 350. In various implementations, a single power amplifier 140a (or 140b) may be coupled to four, six, eight, sixteen, or any number of antennas 350. For example, power amplifier 140a (or 140b) may be coupled to each of antennas 350, using, for example, a splitter, a plurality of amplifier cells, or other suitable means. Likewise, a single power amplifier 142a (or 142b) may be coupled to one or any number of antennas 352. Thus, in FIG. 3A, constant amplitude decomposed RF signal 130a (or 130b) is provided to each of antennas 350 in phased array antenna panel 300, and constant amplitude decomposed RF signal 132a (or 132b) is provided to each of antennas 352 in phased array antenna panel 300.

As illustrated in FIG. 3A, phased array antenna panel 300 includes non-overlapping sub-arrays 354 and 356. Non-overlapping sub-array 354 includes antennas 350 uniquely associated with power amplifiers that transmit constant amplitude decomposed RF signal 130a (or 130b) (i.e., constant amplitude component $S1(t)$ in equation (2) above). Non-overlapping sub-array 356 includes antennas 352 uniquely associated with power amplifiers that transmit constant amplitude decomposed RF signal 132a (or 132b) (i.e., constant amplitude component $S2(t)$ in equation (2) above). In the present implementation, each of antennas 350 in non-overlapping sub-array 354 is uniquely associated with power amplifier 140a (or 140b), and is not associated with power amplifier 142a (or 142b). Conversely, each of antennas 352 in non-overlapping sub-array 356 is uniquely associated with power amplifier 142a (or 142b), and is not associated with power amplifier 140a (or 140b). In one implementation, antennas 350 in non-overlapping sub-array 354 may be uniquely associated with more than one power amplifier 140a (or 140b), while not being associated with any power amplifier 142a (or 142b). In one implementation, antennas 352 in non-overlapping sub-array 356 may be uniquely associated with more than one power amplifier 142a (or 142b), while not being associated with any power amplifier 140a (or 140b). As used herein, the term "non-overlapping sub-arrays" refers to the fact that phased array antenna panel 300 can be bisected into two sides such that no sub-array has an antenna on both sides. For example, phased array antenna panel 300 can be bisected into left and right sides by a line parallel to x-axis 362 located between non-overlapping sub-arrays 354 and 356 such that neither sub-array has an antenna on both the left and right sides; antennas 350 of non-overlapping sub-array 354 are on the left side and antennas 352 of non-overlapping sub-array 356 are on the right side.

In 5G wireless communications, and wireless communications in relation to commercial geostationary satellites, low earth orbit satellites, and other beamforming applications, a phased array antenna panel employs numerous power amplifiers that use much of the phased array antenna panel's power. By decomposing a variable amplitude composite input signal into constant amplitude decomposed RF signals 130a and 132a (or 130b and 132b) prior to their amplification, power amplifiers in phased array antenna panel 300 can operate with more power efficiency and less non-linearity. Thus, phased array antenna panel 300 significantly improves power efficiency and performance in applications that employ numerous power amplifiers. As stated above, different paths taken by constant amplitude decomposed RF signals, such as different paths taken by constant amplitude decomposed RF signals 130a and 132a (or 130b and 132b), can cause imbalance in both gain and phase, and increase the error vector magnitude (EVM). By utilizing a plurality of antennas 350 and 352 in non-overlapping sub-arrays 354 and 356, phased array antenna panel 300 suppresses stochastic imbalance between constant amplitude decomposed RF signals 130a and 132a (or 130b and 132b). Thus, phased array antenna panel 300 significantly decreases EVM in applications that employ constant amplitude decomposed signals.

Figure 3B:
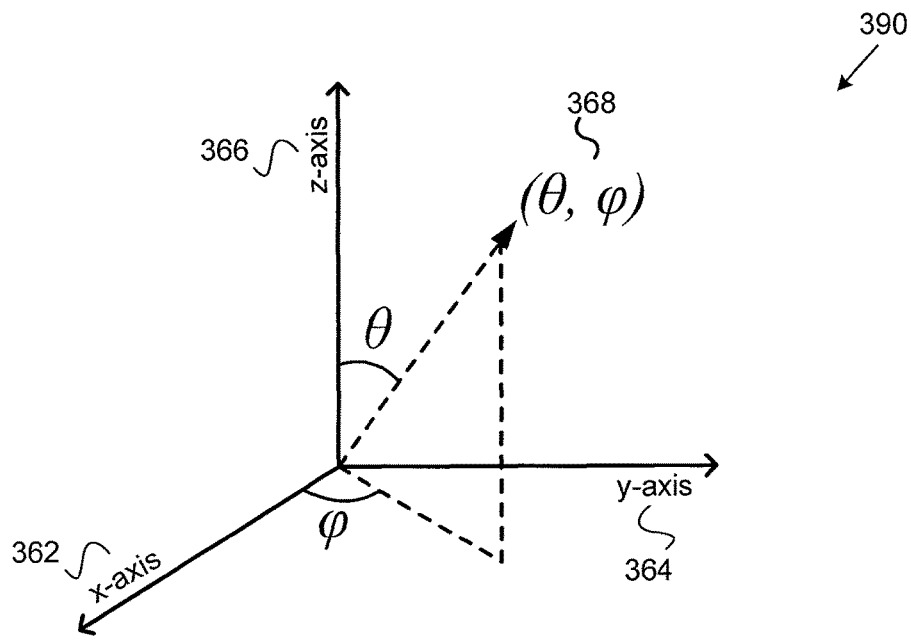
FIG. 3B illustrates a perspective view of a portion of an exemplary coordinate system in relation to one implementation of the present application.

FIG. 3B illustrates a perspective view of a portion of an exemplary coordinate system according to one implementation of the present application. As illustrated in FIG. 3B, coordinate system 390 includes x-axis 362, y-axis 364, z-axis 366, and direction 368. Phased array antenna panel 300 in FIG. 3A lies in the xy-plane of FIG. 3B, defined by x-axis 362 and y-axis 364. Phased array antenna panel 300 is configured to transmit an RF beam in direction 368, defined by $(\theta, \varphi)$. As used herein, $\theta$ represents the angle from z-axis 366 to the transmitted RF beam, and φ represents the angle from x-axis 362 to the transmitted RF beam.

Figure 4:
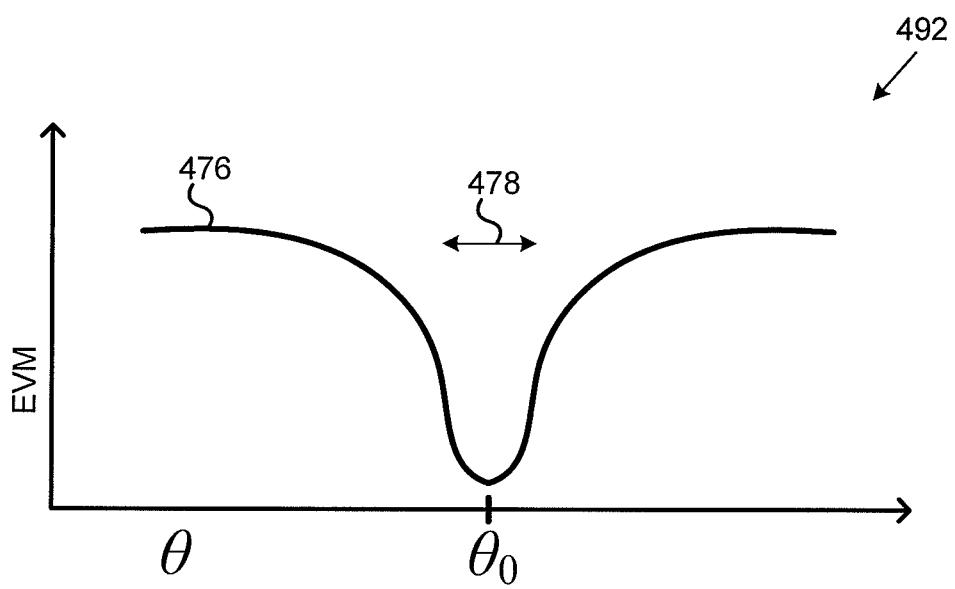
FIG. 4 illustrates a portion of an exemplary error vector magnitude (EVM) graph according to one implementation of the present application.

FIG. 4 illustrates a portion of an exemplary error vector magnitude (EVM) graph according to one implementation of the present application. As illustrated in FIG. 4, EVM graph 492 includes trace 476. Trace 476 represents the EVM for a phased array antenna panel, such as phased array antenna panel 300 in FIG. 3A, versus RF beam angle θ. Relative dimensions of the EVM and RF beam angle θ shown in FIG. 4 may be exaggerated for the purposes of illustration. Accordingly, units and scales are omitted in FIG. 4.

As shown by trace 476 in FIG. 4, the EVM decreases to a minimum around $\theta_0$. A decreased EVM generally correlates to a higher quality transmitter. Thus, $\theta_0$ may represent an intended RF beam angle. In one implementation, the EVM may decrease to more than one minimum and the transmitter may have more than one intended RF beam angle. An EVM below a certain threshold may be desirable for the transmitter design. Bandwidth 478 represents a range of RF beam angle θ for which the EVM is below a design threshold. In practice, a narrow bandwidth 478 limits the scan range of a transmitter.

Figure 5A:
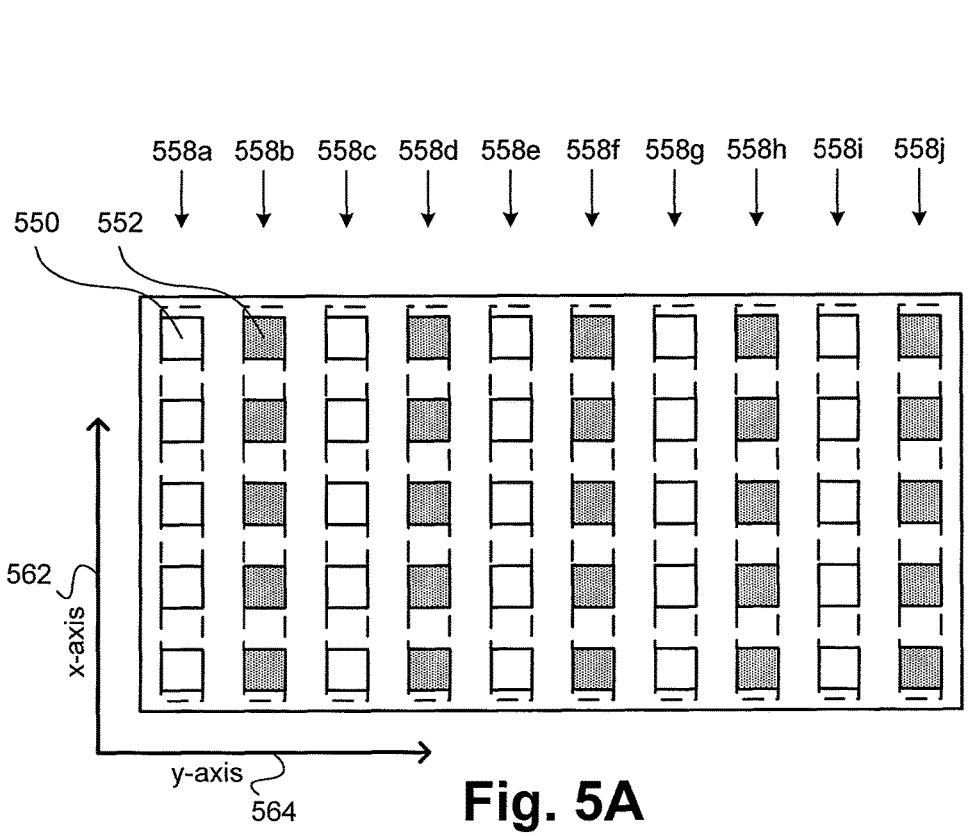
FIG. 5A illustrates a layout diagram of a portion of an exemplary phased array antenna panel according to one implementation of the present application.

FIG. 5A illustrates a layout diagram of a portion of an exemplary phased array antenna panel according to one implementation of the present application. As illustrated in FIG. 5A, phased array antenna panel 500 includes a plurality of antennas 550 (unshaded in the drawings) and a plurality of antennas 552 (shaded in the drawings). In the present implementation, antennas 550 and 552 have a square shape and are arranged in a grid pattern in phased array antenna panel 500. In one implementation, the distance between one antenna and an adjacent antenna is a fixed distance, such as a quarter wavelength (i.e., λ/4). Although FIG. 5A shows fifty (50) antennas 550 and 552, only a portion of phased array antenna panel 500 is shown in FIG. 5A. In practice, for example when used in conjunction with 5G wireless communications (5th generation mobile networks or 5th generation wireless systems), phased array antenna panel 500 may be much larger, and may have one hundred and forty four (144) antennas 550 and 552, arranged, for example, in a twelve (12) by twelve (12) grid pattern. When used in conjunction with commercial geostationary communication satellites or low earth orbit satellites, phased array antenna panel 500 may be even larger, and have, for example, four hundred (400) antennas 550 and 552. In other examples, phased array antenna panel 500 may have any other number of antennas 550 and 552. In one implementation, antennas 550 and 552 may have a shape other than a square, such as a circle. In practice, antenna probes (not shown in FIG. 5A) may be situated in or over cubical or cylindrical cavities that accommodate more efficient transmission or reception of RF signals. Thus, antenna elements 550 and 552 in FIG. 5A may represent a top view of a cubical cavity housing antenna probes. Examples of various antennas that can be used in various implementations of the present application are shown and described in U.S. patent application Ser. No. 15/278,970 filed on Sep. 28, 2016 and titled "Low-Cost and Low-Loss Phased Array Antenna Panel," and U.S. patent application Ser. No. 15/279,171 filed on Sep. 28, 2016 and titled "Phased Array Antenna Panel Having Cavities with RF Shields for Antenna Probes." The disclosures in these related applications are hereby incorporated fully by reference into the present application. In one implementation, antennas 550 and 552 may be arranged in a pattern other than a grid. In one implementation, the distance between one antenna and an adjacent antenna may be greater than a quarter wavelength (i.e., greater than λ/4).

In the present implementation, phased array antenna panel 500 is a flat panel array lying in the xy-plane, defined by x-axis 562 and y-axis 564, employing antennas 550 and 552 coupled to associated active circuits to form a beam for transmission. In one implementation, the beam is formed fully electronically by means of phase and amplitude control circuits associated with antennas 550 and 552. An example of beam forming using phase and amplitude control circuits utilizing dual-polarized antennas is described in U.S. patent application Ser. No. 15/226,785 filed on Aug. 2, 2016, and titled "Large Scale Integration and Control of Antennas with Master Chip and Front End Chips on a Single Antenna Panel." The disclosure in this related application is hereby incorporated fully by reference into the present application. Thus, phased array antenna panel 500 can provide fully electronic beamforming without the use of mechanical parts.

Phased array antenna panel 500 in FIG. 5A may be used as part of an outphasing transmitter, such as outphasing transmitter 100a of FIG. 1A or outphasing transmitter 100b of FIG. 1B. Any of antennas 550 in FIG. 5A generally corresponds to antenna 150a (or 150b), and any of antennas 552 in FIG. 5A generally corresponds to antenna 152a (or 152b). In one implementation, a single power amplifier 140a (or 140b) is coupled to a single one of antennas 550. In various implementations, a single power amplifier 140a (or 140b) may be coupled to four, six, eight, sixteen, or any number of antennas 550. For example, power amplifier 140a (or 140b) may be coupled to each of antennas 550, using, for example, a splitter, a plurality of amplifier cells, or other suitable means. Likewise, a single power amplifier 142a (or 142b) may be coupled to one or any number of antennas 552. Thus, in FIG. 5A, constant amplitude decomposed RF signal 130a (or 130b) is provided to each of antennas 550 in phased array antenna panel 500, and constant amplitude decomposed RF signal 132a (or 132b) is provided to each of antennas 552 in phased array antenna panel 500.

As illustrated in FIG. 5A, phased array antenna panel 500 includes interleaved antenna rows 558a, 558b, 558c, 558d, 558e, 558f, 558g, 558h, 558i, and 558j, collectively referred to as interleaved antenna rows 558. Interleaved antenna rows 558a, 558c, 558e, 558g, and 558i include antennas 550 uniquely associated with power amplifiers that transmit constant amplitude decomposed RF signal 130a (or 130b) (i.e., constant amplitude component $S1(t)$ in equation (2) above). Interleaved antenna rows 558b, 558d, 558f, 558h, and 558j include antennas 552 uniquely associated with power amplifiers that transmit constant amplitude decomposed RF signal 132a (or 132b) (i.e., constant amplitude component $S2(t)$ in equation (2) above).

In the present implementation, each of antennas 550 in interleaved antenna rows 558a, 558c, 558e, 558g, and 558i is uniquely associated with power amplifier 140a (or 140b), and is not associated with power amplifier 142a (or 142b). Conversely, each of antennas 552 in interleaved antenna rows 558b, 558d, 558f, 558h, and 558j is uniquely associated with power amplifier 142a (or 142b), and is not associated with power amplifier 140a (or 140b). In one implementation, antennas 550 in interleaved antenna rows 558a, 558c, 558e, 558g, and 558i may be uniquely associated with more than one power amplifier 140a (or 140b), while not being associated with any power amplifier 142a (or 142b). In one implementation, antennas 552 in interleaved antenna rows 558b, 558d, 558f, 558h, and 558j may be uniquely associated with more than one power amplifier 142a (or 142b), while not being associated with any power amplifier 140*a* (or 140*b*). As used herein, the term "interleaved antenna rows" refers to the fact that an antenna row and its adjacent antenna row are uniquely associated with power amplifiers that transmit different constant amplitude decomposed RF signals that correspond to constant amplitude component $S1(t)$ or constant amplitude component $S2(t)$ in equation (2) above, respectively. For example, antenna row 558*a* is uniquely associated with power amplifiers that transmit constant amplitude decomposed RF signal 130*a* (or 130*b*) (i.e., constant amplitude component $S1(t)$ in equation (2) above), while adjacent antenna row 558*b* is uniquely associated with power amplifiers that transmit constant amplitude decomposed RF signal 132*a* (or 132*b*) (i.e., constant amplitude component $S2(t)$ in equation (2) above). In the present implementation, interleaved antenna rows 558 are interleaved along the direction of y-axis 564. In various implementations, interleaved antenna rows 558 may be interleaved along the direction of x-axis 562, or any other direction.

By utilizing a plurality of interleaved antenna rows 558 to alternate assignment of constant amplitude decomposed RF signals 130*a* and 132*a* (or 130*b* and 132*b*), phased array antenna panel 500 significantly decreases EVM over a wide range of RF beam angles. The various implementations and advantages of power efficiency, improvement in non-linearity and performance, and decreased EVM discussed in relation to phased array antenna panel 300 in FIG. 3A may also apply to phased array antenna panel 500 in FIG. 5A.

Figure 5B:
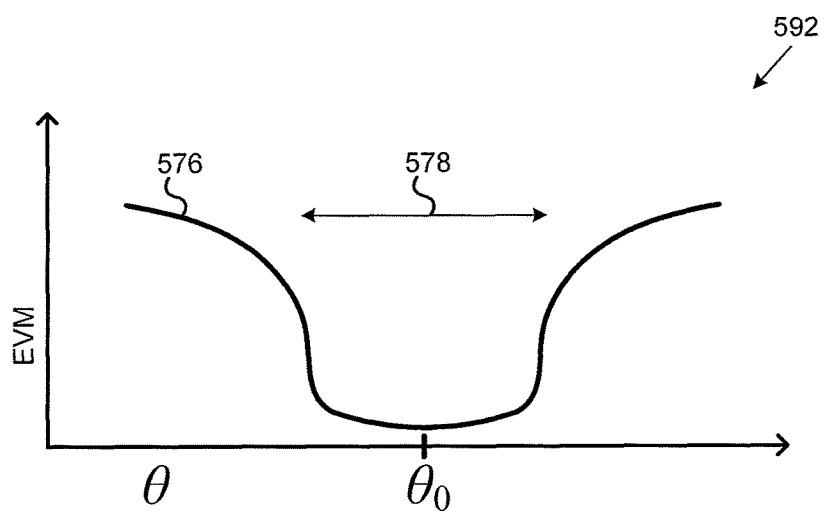
FIG. 5B illustrates a portion of an exemplary error vector magnitude (EVM) graph according to one implementation of the present application.

FIG. 5B illustrates a portion of an exemplary error vector magnitude (EVM) graph according to one implementation of the present application. As illustrated in FIG. 5B, EVM graph 592 includes trace 576. Trace 576 represents the EVM for a phased array antenna panel, such as phased array antenna panel 500 in FIG. 5A, versus RF beam angle θ. Relative dimensions of the EVM and RF beam angle θ shown in FIG. 5B may be exaggerated for the purposes of illustration. Accordingly, units and scales are omitted in FIG. 5B.

As shown by trace 576 in FIG. 5B, the EVM decreases to a minimum around $\theta_0$. A decreased EVM generally correlates to a higher quality transmitter. Thus, $\theta_0$ may represent an intended RF beam angle. In one implementation, the EVM may decrease to more than one minimum and the transmitter may have more than one intended RF beam angle. An EVM below a certain threshold may be desirable for the transmitter design. Bandwidth 578 represents a range of RF beam angle θ for which the EVM is below a design threshold. As illustrated in FIG. 5B, bandwidth 578, corresponding to the interleaved antenna rows configuration of phased array antenna panel 500 in FIG. 5A, is significantly wider than bandwidth 478, corresponding to the non-overlapping sub-arrays configuration of phased array antenna panel 300 in FIG. 3A. In practice, a wider bandwidth, such as bandwidth 578, extends the scan range of a transmitter.

Figure 6A:
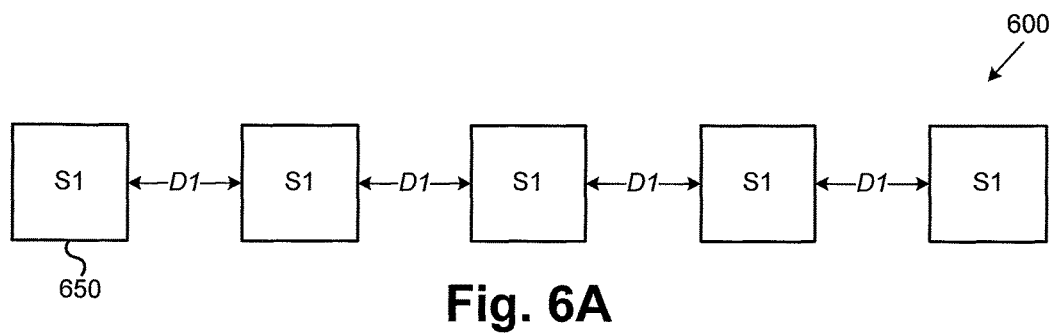
FIGS. 6A and 6B illustrate a layout diagram of a portion of an exemplary phased array antenna panel according to one implementation of the present application.

FIG. 6A illustrates a layout diagram of a portion of an exemplary phased array antenna panel according to one implementation of the present application. Phased array antenna panel 600 in FIG. 6A may generally correspond to a portion of phased array antenna panel 300 in FIG. 3A. As illustrated in FIG. 6A, phased array antenna panel 600 includes a plurality of antennas 650. Each antenna 650 is uniquely associated with power amplifiers that transmit constant amplitude decomposed RF signal 130*a* (or 130*b*) (i.e., constant amplitude component $S1(t)$ in equation (2) above). In one implementation, for a wireless transmitter transmitting signals at 10 GHz (i.e., λ=30 mm), each antenna 650 may need an area of at least a quarter wavelength (i.e., λ/4=7.5 mm) by a quarter wavelength (i.e., λ/4=7.5 mm). Antennas 650 may each have a square shape having dimensions of 7.5 mm by 7.5 mm, for example. Antennas 650 may be, for example, cavity antennas or patch antennas or other types of antennas. The shape of antennas 650 may correspond to, for example, the shape of an opening in a cavity antenna or the shape of an antenna plate in a patch antenna. In other implementations, antennas 650 may have substantially circular shapes, or may have any other shapes.

As illustrated in FIG. 6A, each antenna element is uniformly spaced from each adjacent antenna element. In the present implementation, distance D1 uniformly separates various adjacent antennas elements. Notably, distance D1 in FIG. 6A also represents the distance between each antenna 650 that transmits constant amplitude component $S1(t)$. In one implementation, distance D1 may be a quarter wavelength (i.e., λ/4). In various implementations, distance D1 may be less than or greater than a quarter wavelength (i.e., less than or greater than λ/4).

Figure 6B:
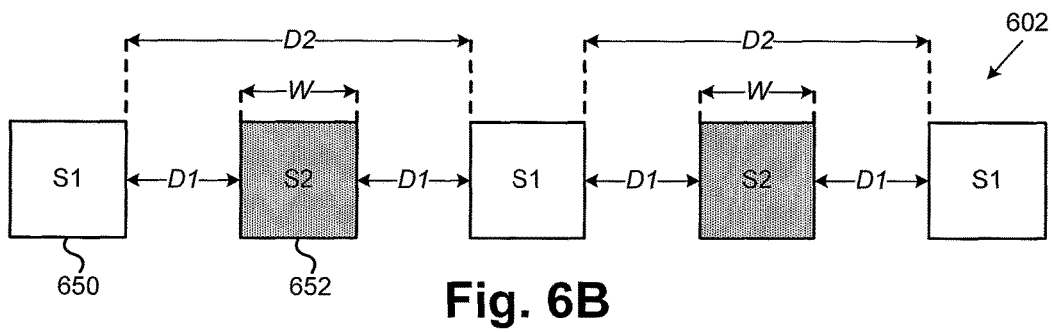

FIG. 6B illustrates a layout diagram of a portion of an exemplary phased array antenna panel according to one implementation of the present application. Phased array antenna panel 602 in FIG. 6B may generally correspond to a portion of phased array antenna panel 500 in FIG. 5A. As illustrated in FIG. 6B, phased array antenna panel 602 includes a plurality of antennas 650 interleaved with a plurality of antennas 652. Each antenna 650 is that transmit constant amplitude decomposed RF signal 130*a* (or 130*b*) (i.e., constant amplitude component $S1(t)$ in equation (2) above). Each antenna 652 is uniquely associated with power amplifiers that transmit constant amplitude decomposed RF signal 132*a* (or 132*b*) (i.e., constant amplitude component $S2(t)$ in equation (2) above). In one implementation, for a wireless transmitter transmitting signals at 10 GHz (i.e., λ=30 mm), each antenna 650 and 652 may need an area of at least a quarter wavelength (i.e., λ/4=7.5 mm) by a quarter wavelength (i.e., λ/4=7.5 mm). Antennas 650 and 652 may each have a square shape having dimensions of 7.5 mm by 7.5 mm, for example. Antennas 650 and 652 may be, for example, cavity antennas or patch antennas or other types of antennas. The shape of antennas 650 and 652 may correspond to, for example, the shape of an opening in a cavity antenna or the shape of an antenna plate in a patch antenna. In other implementations, antennas 650 and 652 may have substantially circular shapes, or may have any other shapes.

As illustrated in FIG. 6B, each antenna element is uniformly spaced from each adjacent antenna element. In the present implementation, distance D1 uniformly separates various adjacent antennas elements. Notably, in contrast to FIG. 6A, distance D1 in FIG. 6B does not represent the distance between each antenna 650 that transmits constant amplitude component $S1(t)$. Rather, distance D2 uniformly separates each antenna 650. In the present implementation, distance D2 is defined by equation (3) below:

$$D2 = 2*D1 + W \qquad \text{Equation (3)}$$

where W represents the width of each antenna 652. In one implementation, distance D1 may be a quarter wavelength (i.e., λ/4). In various implementations, distance D1 may be less than or greater than a quarter wavelength (i.e., less than or greater than λ/4). In one implementation, width W may be a quarter wavelength (i.e., λ/4). In various implementations, width W may be less than or greater than a quarter wavelength (i.e., less than or greater than λ/4). In one implementation, distance D2 may be three quarter wavelengths (i.e., 3λ/4). In various implementations, distance D2 may be less than or greater than three quarter wavelengths (i.e., less than or greater than 3λ/4).

As illustrated in FIGS. 6A and 6B, when antennas 650 are interleaved with antennas 652, as in the interleaved antenna rows configuration of phased array antenna panel 500 in FIG. 5A, if each antenna element is uniformly spaced from its adjacent antenna element by distance D1, the distance between each antenna 650 increases as compared to when antennas 650 are not interleaved with antennas 652, as in the non-overlapping sub-arrays configuration of phased array antenna panel 300 in FIG. 3A. In practice, a relatively large distance between antennas 650 uniquely associated with power amplifiers that transmit constant amplitude component $S1(t)$, such as distance D2, can cause a phased array antenna panel to transmit RF beams in unintended directions, also referred to as "grating lobes." For example, phased array antenna panel 602 may exhibit grating lobes when distance D2 is greater than a half wavelength (i.e., greater than λ/2). In high frequency applications having short wavelengths, it can be complex and costly to manufacture phased array antenna panel 602 such that distance D2 is less than or equal to a half wavelength (i.e., less than or equal to λ/2).

Figure 6C:
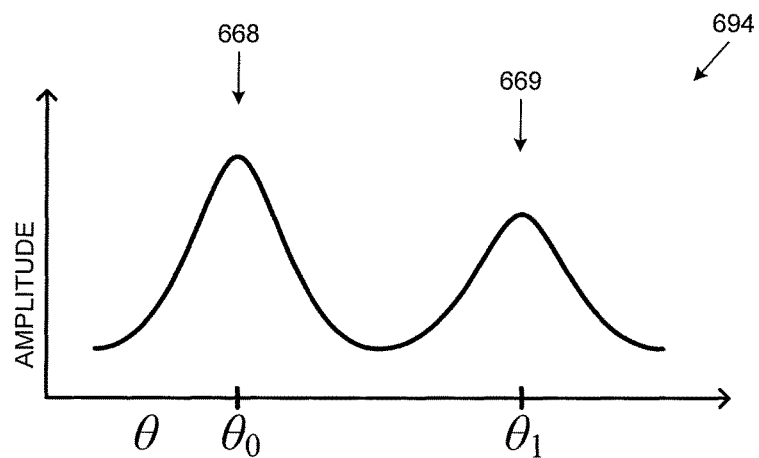
FIG. 6C illustrates a portion of an exemplary radiation pattern according to one implementation of the present application.

FIG. 6C illustrates a portion of an exemplary radiation pattern according to one implementation of the present application. As illustrated in FIG. 6C, radiation pattern 694 represents the amplitude versus angle θ of signals transmitted from a phased array antenna panel, such as phased array antenna panel 500 in FIG. 5A. Relative dimensions of the amplitude and angle θ shown in FIG. 6C may be exaggerated for the purposes of illustration. Accordingly, units and scales are omitted in FIG. 6C.

As shown in FIG. 6C, radiation pattern 694 includes intended RF beam 668, as indicated by the amplitude increasing to a maximum around intended RF beam angle $\theta_0$. As further shown in FIG. 6C, radiation pattern 694 includes grating lobe 669, as indicated by the amplitude increasing to another maximum around grating lobe angle $\theta_1$. As stated above, a relatively large uniform spacing between antennas uniquely associated with power amplifiers that transmit a constant amplitude component, such as distance D2 in FIG. 6B, can cause undesirable grating lobe 669. In some implementations, the radiation pattern of the transmitter may have more than one intended RF beam and/or more than one undesirable grating lobe. In practice, grating lobes interfere with proper reception of intended RF beams.

Figure 7A:
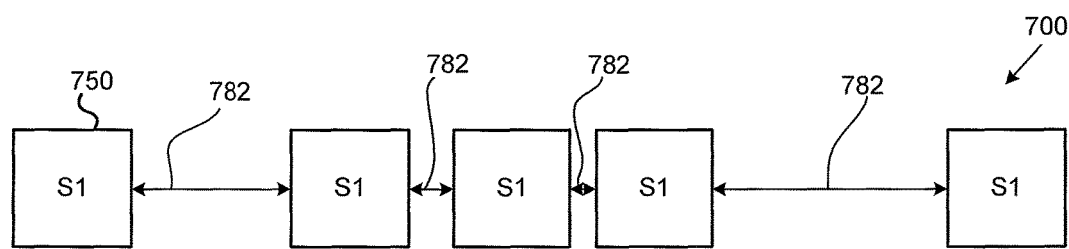
FIG. 7A illustrates a layout diagram of a portion of an exemplary phased array antenna panel according to one implementation of the present application.

FIG. 7A illustrates a layout diagram of a portion of an exemplary phased array antenna panel according to one implementation of the present application. As illustrated in FIG. 7A, phased array antenna panel 700 includes a plurality of non-uniformly spaced antennas 750. In the present implementation, each antenna 750 is spaced from its adjacent antennas by a different distance. As stated above, manufacturing constraints make it difficult to manufacture a phased array antenna panel with small antenna spacing, and large uniform antenna spacing can produce grating lobes. One solution is to use non-uniform antenna spacing, such as in phased array antenna panel 700. Non-uniform antenna spacings 782 reduce grating lobes, as discussed further below. The dimensions of each antenna 750 compared to the dimensions of non-uniform antenna spacings 782 may be exaggerated for the purposes of illustration. The various implementations and examples of transmission frequencies, antenna sizes, antenna shapes, antenna types, and uniquely associated power amplifiers discussed in relation to antennas 650 in FIG. 6A may also apply to non-uniformly spaced antennas 750 shown in FIG. 7A.

Figure 7B:
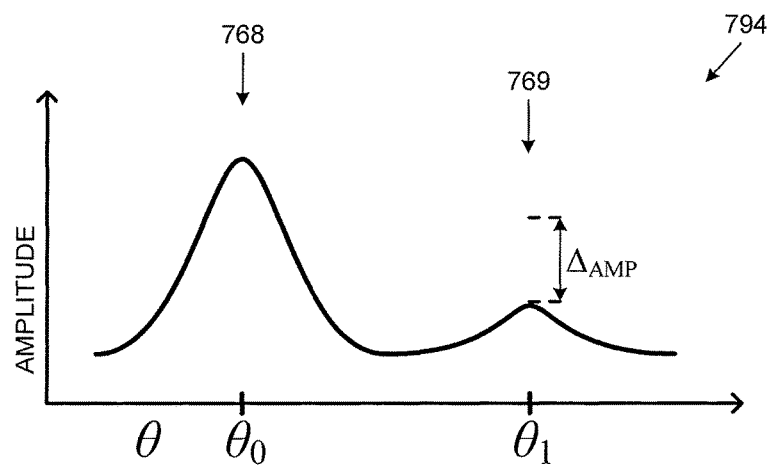
FIG. 7B illustrates a portion of an exemplary radiation pattern according to one implementation of the present application.

FIG. 7B illustrates a portion of an exemplary radiation pattern according to one implementation of the present application. As illustrated in FIG. 7B, radiation pattern 794 represents the amplitude versus angle θ of signals transmitted from a phased array antenna panel, such as phased array antenna panel 700 in FIG. 7A. Relative dimensions of the amplitude and angle θ shown in FIG. 7B may be exaggerated for the purposes of illustration. Accordingly, units and scales are omitted in FIG. 7B.

As shown in FIG. 7B, radiation pattern 794 includes intended RF beam 768, as indicated by the amplitude increasing to a maximum around intended RF beam angle $\theta_0$. As further shown in FIG. 7B, radiation pattern 794 includes grating lobe 769, as indicated by the amplitude increasing to another maximum around grating lobe angle $\theta_1$. As stated above, non-uniformly spaced antennas can reduce undesirable grating lobe 769. As illustrated in FIG. 7B, grating lobe 769, corresponding to the non-uniformly spaced antennas configuration of phased array antenna panel 700 in FIG. 7A, is significantly reduced by $\Delta_{AMP}$ as compared to grating lobe 669 in FIG. 6C, corresponding to the uniformly spaced antennas configuration of phased array antenna panel 602 in FIG. 6B. In practice, reducing grating lobes reduces interference with proper reception of intended RF beams. However, it can be complex and costly to manufacture phased array antenna panel 700 due to the unique dimensions of non-uniform antenna spacings 782 in non-uniformly spaced antennas 750. Additionally, non-uniformly spaced antennas 750 do not readily accommodate an interleaving antenna configuration, such as the interleaving configuration of antennas 550 and antennas 552 in FIG. 5A, since such interleaving configuration requires a relatively uniform spacing of antennas 550 and antennas 552.

Figure 8C:
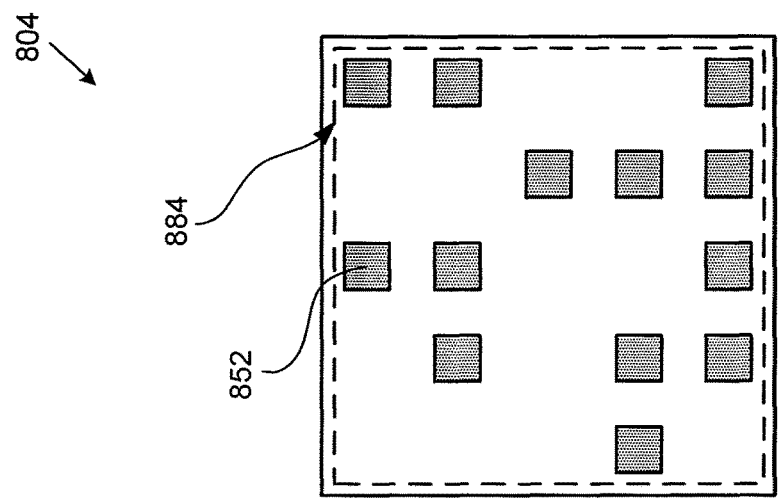
FIGS. 8A, 8B, and 8C illustrate layout diagrams of a portion of an exemplary phased array antenna panel according to one implementation of the present application.
Figure 8B:
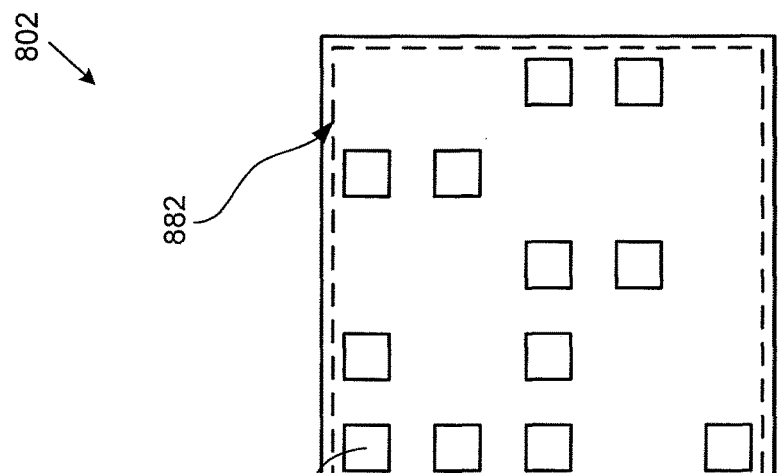
Figure 8A:
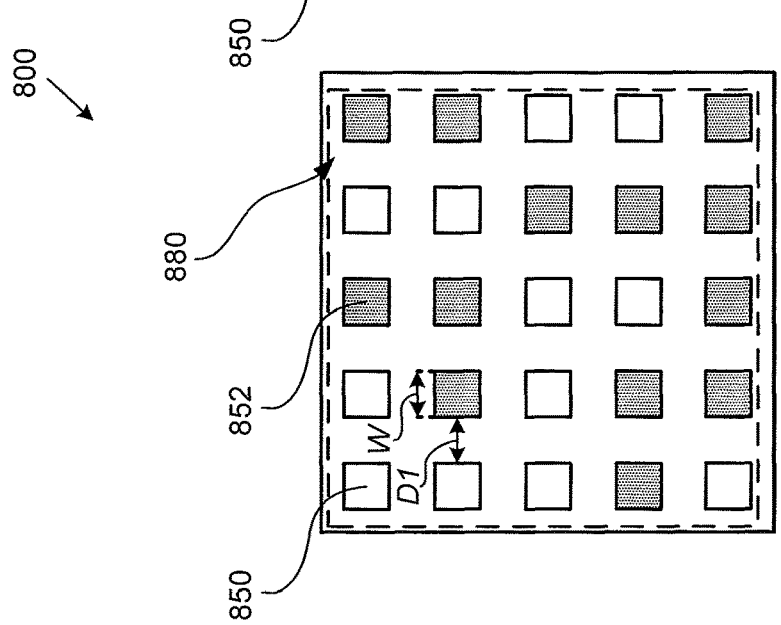

FIG. 8A illustrates a layout diagram of a portion of an exemplary phased array antenna panel according to one implementation of the present application. As illustrated in FIG. 8A, phased array antenna panel 800 shows random assignment 880 of antennas 850 (unshaded in the drawings) and antennas 852 (shaded in the drawings). In the present implementation, antennas 850 may be hard-wired to power amplifiers that transmit constant amplitude decomposed RF signal 130a (or 130b) (i.e., constant amplitude component $S1(t)$ in equation (2) above). Antennas 852 may be hard-wired to power amplifiers that transmit constant amplitude decomposed RF signal 132a (or 132b) (i.e., constant amplitude component $S2(t)$ in equation (2) above). The hard-wired random assignment of antennas in phased array antenna panel 800 results in a random configuration of antennas that are hard-wired to transmit constant amplitude component S1 $(t)$ and another random configuration of antennas that are hard-wired to transmit constant amplitude component $S2(t)$. Such random assignment is predetermined, prior to manufacturing phased array antennal panel 800, by any method known in the art, such as using various random number generation algorithms.

In the implementation shown in FIG. 8A, each antenna element is uniformly spaced from each adjacent antenna element, and each antenna element has a uniform width. In the present implementation, distance D1 uniformly separates various adjacent antennas elements having uniform width W. The various implementations and examples of antenna shapes, sizes, numbers, types, and beamforming, and power amplifier couplings discussed in relation to phased array antenna panel 300 in FIG. 3A may also apply to phased array antenna panel 800 shown in FIG. 8A.

FIG. 8B illustrates a layout diagram of a portion of an exemplary phased array antenna panel according to one implementation of the present application. Phased array antenna panel 802 in FIG. 8B corresponds to phased array antenna panel 800 in FIG. 8A. As illustrated in FIG. 8B, phased array antenna panel 802 shows random assignment 882 of antennas 850. Phased array antenna panel 802 in FIG. 8B shows the portion of phased array antenna panel 800 in FIG. 8A that is hard-wired to transmit constant amplitude component S1 ($t$). As illustrated in FIG. 8B, antennas 850 in random assignment 882 are non-uniformly spaced relative to each other.

FIG. 8C illustrates a layout diagram of a portion of an exemplary phased array antenna panel according to one implementation of the present application. Phased array antenna panel 804 in FIG. 8C corresponds to phased array antenna panel 800 in FIG. 8A. As illustrated in FIG. 8C, phased array antenna panel 804 shows random assignment 884 of antennas 852. Thus, phased array antenna panel 804 in FIG. 8C shows the portion of phased array antenna panel 800 in FIG. 8A that is hard-wired to transmit constant amplitude component S2($t$). As illustrated in FIG. 8C, antennas 852 in random assignment 884 are non-uniformly spaced relative to each other.

By utilizing random assignment 880, phased array antenna panel 800 exhibits non-uniform antenna spacing for antennas 850 that transmit constant amplitude decomposed RF signal 130$a$ (or 130$b$) and for antennas 852 that transmit constant amplitude decomposed RF signal 132$a$ (or 132$b$). Thus, phased array antenna panel 800 effectively reduces grating lobes in applications that employ constant amplitude decomposed signals. In addition, by using the same distance D1 that uniformly separates various adjacent antennas elements having uniform width W, phased array antenna panel 800 can be more easily manufactured.

Figure 9A:
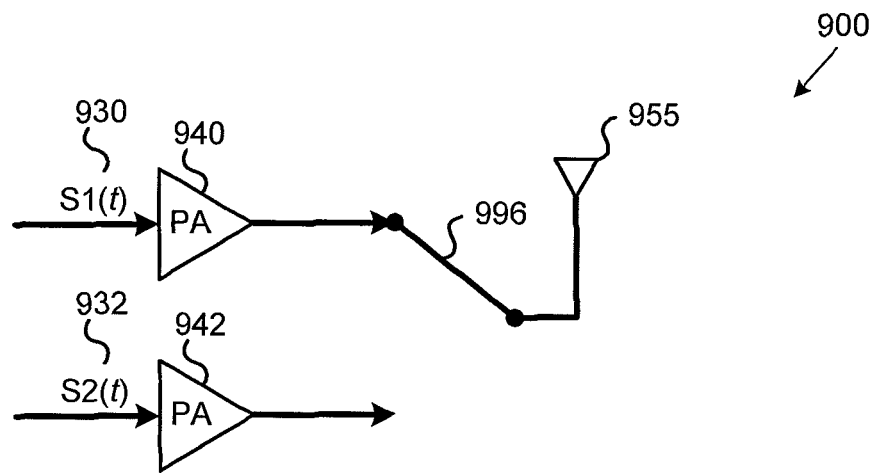
FIGS. 9A and 9B illustrate an exemplary diagram of a portion of an exemplary outphasing transmitter according to one implementation of the present application.
Figure 9B:
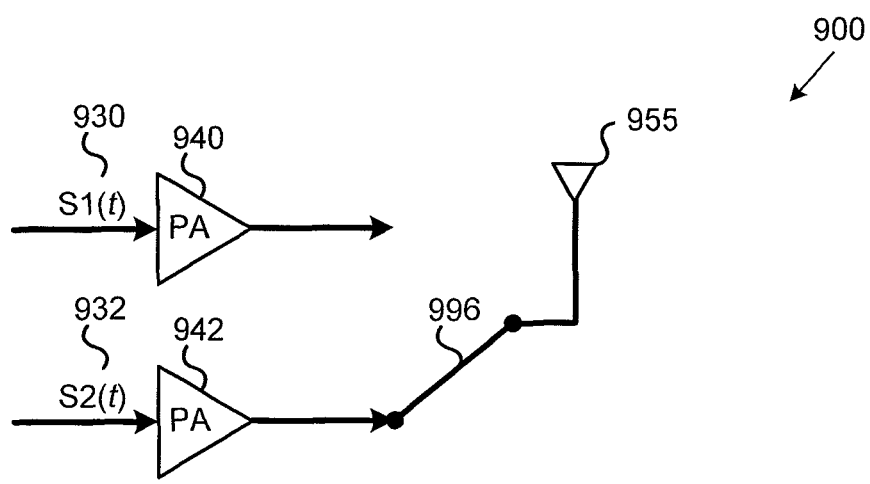

FIGS. 9A and 9B illustrate an exemplary diagram of a portion of an exemplary outphasing transmitter according to one implementation of the present application. As illustrated in FIGS. 9A and 9B, outphasing transmitter 900 includes power amplifiers 940 and 942, switch 996, and antenna 955. Antenna 955 is configured to be dynamically and selectably assigned to power amplifier 940 or 942. In one implementation, antenna 955 may be dynamically and selectably assigned based on control signals received from a master chip (not shown in FIGS. 9A and 9B). As shown in FIG. 9A, switch 996 can assign power amplifier 940 to antenna 955. As shown in FIG. 9B, switch 996 can also assign power amplifier 942 to antenna 955. Thus, antenna 955 in outphasing transmitter 900 can transmit either constant amplitude decomposed RF signal 930 or 932 (i.e., either constant amplitude component S1($t$) or constant amplitude component S2($t$)).

In the present implementation, switch 996 is coupled between power amplifiers 940 and 942 and antenna 955. In one implementation, switch 996 may be coupled between a decomposition block (not shown in FIGS. 9A and 9B) and a power amplifier. Switch 996 may be, for example, an RF switch or an RF multiplexer. Antenna 955 may be part of a phased array antenna panel. In one implementation, a single switch 996 assigns a single antenna 955 in a phased array antenna panel. In various implementations, a single switch 996 may assign four, six, eight, sixteen, or any number of antennas 955 in a phased array antenna panel.

FIGS. 10A, 10B, and 10C illustrate a layout diagram of a portion of an exemplary phased array antenna panel according to one implementation of the present application. As illustrated in FIGS. 10A, 10B, and 10C, phased array antenna panel 1000 includes antennas 1050 (unshaded in the drawings) and antennas 1052 (shaded in the drawings). Each of antennas 1050 in FIGS. 10A, 10B, and 10C may generally correspond to antenna 955 in FIG. 9A dynamically and selectably assigned to power amplifiers that transmit constant amplitude decomposed RF signal 930 (i.e., constant amplitude component S1($t$)). Each of antennas 1052 in FIGS. 10A, 10B, and 10C may generally correspond to antenna 955 in FIG. 9B dynamically and selectably assigned to power amplifiers that transmit constant amplitude decomposed RF signal 932 (i.e., constant amplitude component S2($t$)). The various implementations and examples of antenna shapes, sizes, distances, numbers, types, and beamforming, and power amplifier couplings discussed in relation to phased array antenna panel 300 in FIG. 3A may also apply to phased array antenna panel 1000 shown in FIGS. 10A, 10B, and 10C.

In the implementation shown in FIGS. 10A, 10B, and 10C, phased array antenna panel 1000 can form an RF beam and change the direction of the RF beam. Phased array antenna panel 1000 can dynamically and selectably assign antennas 1050 and 1052 based on the desired direction of the RF beam to be formed. As illustrated in FIG. 10A, when transmitting an RF beam having angle φ=0°, the outphasing transmitter, such as outphasing transmitter 100$a$ or 100$b$, dynamically and selectably assigns antennas 1050 and 1052 in horizontal rows. As illustrated in FIG. 10B, when transmitting an RF beam having angle φ=90°, the outphasing transmitter, such as outphasing transmitter 100$a$ or 100$b$, dynamically and selectably assigns antennas 1050 and 1052 in vertical rows. As illustrated in FIG. 10C, when transmitting an RF beam having angle φ=45°, the outphasing transmitter, such as outphasing transmitter 100$a$ or 100$b$, dynamically and selectably assigns antennas 1050 and 1052 in diagonal rows. By dynamically assigning antennas 1050 and 1052 based on RF beam angle φ as shown in FIGS. 10A, 10B, and 10C, phased array antenna panel 1000 can decrease EVM while also minimizing grating lobes. In various implementations, the outphasing transmitter may dynamically assign antennas 1050 and 1052 differently for φ=0°, φ=90°, and φ=45°, in patterns other than rows, and/or based on factors other than or in addition to RF beam angle φ.

FIG. 11 illustrates an exemplary lookup table according to one implementation of the present application. Lookup table 1100 shows exemplary antenna assignments for a phased array antenna panel. An outphasing transmitter, such as outphasing transmitter 100$a$ or 100$b$, references lookup table 1100 to dynamically and selectably assign antennas in the phased array antenna panel to either the constant amplitude component S1($t$) (represented simply by S1 in lookup table 1100) or the constant amplitude component S2($t$) (represented simply by S2 in lookup table 1100). In the present implementation, antenna assignments in lookup table 1100 are referenced based on the desired direction of the RF beam to be formed. For example, when transmitting an RF beam in direction of ($θ_i$, $φ_1$), the outphasing transmitter references $θ_i$ in the θ index of lookup table 1100, references $φ_1$ in the φ index, and retrieves the antenna assignment values corresponding to ($θ_i$, $φ_1$) in lookup table 1100. For the purpose of an example only, antenna assignment values corresponding to an RF beam formed in the direction of ($θ_i$, $φ_1$) are shown by the corresponding row in lookup table 1100 by table entries S1, S1, S2, S2, S2, . . . S1. As another example, antenna assignment values corresponding to an RF beam formed in the direction of ($θ_i$, $φ_m$) are shown by the corresponding row in lookup table 1100 by table entries S1, S1, S1, S2, S2, . . . S2. As yet another example, antenna assignment values corresponding to an RF beam formed in the direction of $(\theta_k, \varphi_n)$ are shown by the corresponding row in lookup table 1100 by table entries S2, S2, S1, S1, S1, . . . S2.

The outphasing transmitter uses the antenna assignment values to dynamically assign antennas to S1(*t*) or S2(*t*). For example, the outphasing transmitter can use the antenna assignment values to generate control signals for switches, such as switches 996, to dynamically assign antennas to S1(*t*) or S2(*t*). In the present implementation, each antenna assignment in lookup table lookup table 1100 represents the antenna assignment that yields the minimum grating lobe for the corresponding RF beam direction. Such assignments are predetermined based on simulations, or tests and measurements performed prior to mass manufacturing of the outphasing transmitter by various methods known in the art, such as simulation using high frequency structure simulator (HFSS) software, or laboratory testing of sample prototypes of the phased array antenna panels.

In one implementation, lookup table 1100 may be stored in a master chip (not shown in FIG. 11), in its processor or in its memory, such as read-only memory (ROM) or random-access memory (RAM). When stored in a master chip, lookup table 1100 may contain assignments for all antennas in the phased array antenna panel. In one implementation, lookup table 1100 may be stored in an RF front end chip (not shown in FIG. 11), in its processor or in its memory, such as ROM or RAM. In one implementation, the RF front end chip may be the same RF front end chip that includes decomposition block 120a (or 120b), power amplifiers 140a and 142a (or 140b and 142b), and other components of outphasing transmitter 100a (or 100b) in FIG. 1A (or FIG. 1B). When stored in an RF front end chip, lookup table 1100 may contain assignments for antennas associated with the RF front end chip. In one implementation, each antenna assignment in lookup table 1100 may represent an antenna assignment that optimizes factors other than or in addition to grating lobe. In one implementation, the outphasing transmitter may reference antenna assignments in lookup table 1100 based on factors other than or in addition to the desired RF beam direction. By referencing lookup table 1100, outphasing transmitter 100a or 100b greatly simplifies dynamically and selectably assigning antennas in a phased array antenna panel.

FIGS. 12A, 12B, and 12C illustrate a layout diagram of a portion of an exemplary phased array antenna panel according to one implementation of the present application. As illustrated in FIGS. 12A, 12B, and 12C, phased array antenna panel 1200 shows random assignments 1280, 1286, and 1288 of antennas. Each antenna 1250 (unshaded in the drawings) may generally correspond to antenna 955 in FIG. 9A dynamically and selectably assigned to power amplifiers that transmit constant amplitude decomposed RF signal 930 (i.e., constant amplitude component S1(*t*)). Each antenna 1252 (shaded in the drawings) may generally correspond to antenna 955 in FIG. 9B dynamically and selectably assigned to power amplifiers that transmit constant amplitude decomposed RF signal 932 (i.e., constant amplitude component S2(*t*)). In the implementation shown in FIGS. 12A, 12B, and 12C, each antenna element is uniform spaced from each adjacent antenna element, and each antenna element has a uniform width. In the present implementation, distance D1 uniformly separates various adjacent antennas elements having uniform width W. The various implementations and examples of antenna shapes, sizes, distances, numbers, types, and beamforming, and power amplifier couplings discussed in relation to phased array antenna panel 300 in FIG. 3A may also apply to phased array antenna panel 1200 shown in FIGS. 12A, 12B, and 12C.

As illustrated in FIGS. 12A, 12B, and 12C, the outphasing transmitter, such as outphasing transmitter 100a or 100b, dynamically and selectably assigns antennas in random assignment 1280 (FIG. 12A), random assignment 1286 (FIG. 12B), and random assignment 1288 (FIG. 12C). The outphasing transmitter can dynamically and selectably assign antennas in numerous other random assignments, only examples of which are shown in FIGS. 12A, 12B, and 12C. In one implementation, such random assignments may be made by a processor of a master chip (not shown in FIGS. 12A, 12B, and 12C), by any method known in the art, such as using various random number generation algorithms. In one implementation, the outphasing transmitter can dynamically and selectably assign antennas in various random assignments in conjunction with a change in the direction of the RF beam to be formed by phased array antenna panel 1200.

By dynamically assigning antennas in random assignments 1280, 1286, and 1288, phased array antenna panel 1200 effectively results in non-uniform antenna spacing for antennas that transmit constant amplitude decomposed RF signal 930 and for antennas that transmit constant amplitude decomposed RF signal 932. Thus, phased array antenna panel 1200 effectively reduces grating lobes in applications that employ constant amplitude decomposed signals. In addition, by using the same distance D1 that uniformly separates various adjacent antennas elements having uniform width W, phased array antenna panel 1200 can be more easily manufactured.

Thus, various implementations of the present application achieve a transmitter and a wireless communication system that overcome the deficiencies in the art by using phased array antenna panels with decomposed RF signals. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. An outphasing transmitter utilizing a phased array antenna panel, said outphasing transmitter comprising:
    a decomposition block configured to decompose a composite input signal into a first decomposed RF signal and a second decomposed RF signal;
    said first decomposed RF signal coupled to a first power amplifier;
    said second decomposed RF signal coupled to a second power amplifier;
    a first random plurality of antennas being randomly hard-wired to said first power amplifier;
    a second random plurality of antennas being randomly hard-wired to said second power amplifier.

2. The outphasing transmitter of claim 1, wherein said first random plurality of antennas is non-uniformly spaced.

3. The outphasing transmitter of claim 1, wherein said second random plurality of antennas is non-uniformly spaced.

4. The outphasing transmitter of claim 1, wherein said first decomposed RF signal and said second decomposed RF signal are constant amplitude signals.

5. An outphasing transmitter utilizing a phased array antenna panel, said outphasing transmitter comprising:
- a decomposition block configured to decompose a composite input signal into a first decomposed RF signal and a second decomposed RF signal;
- said first decomposed RF signal coupled to a first power amplifier;
- said second decomposed RF signal coupled to a second power amplifier;
- a first plurality of antennas being dynamically and selectably assigned to said first power amplifier;
- a second plurality of antennas being dynamically and selectably assigned to said second power amplifier.

6. The outphasing transmitter of claim 5, wherein said outphasing transmitter dynamically assigns said first plurality of antennas to said first power amplifier by at least one switch.

7. The outphasing transmitter of claim 5, wherein said outphasing transmitter dynamically assigns said first plurality of antennas to said first power amplifier based upon a direction of an RF beam formed by said phased array antenna panel.

8. The outphasing transmitter of claim 5, wherein said outphasing transmitter dynamically assigns said first plurality of antennas to said first power amplifier by referencing a lookup table.

9. The outphasing transmitter of claim 5, wherein said outphasing transmitter dynamically assigns said first plurality of antennas to said first power amplifier in a random assignment.

10. The outphasing transmitter of claim 5, wherein said outphasing transmitter dynamically assigns said second plurality of antennas to said second power amplifier by at least one switch.

11. The outphasing transmitter of claim 5, wherein said outphasing transmitter dynamically assigns said second plurality of antennas to said second power amplifier based upon a direction of an RF beam formed by said phased array antenna panel.

12. The outphasing transmitter of claim 5, wherein said outphasing transmitter dynamically assigns said second plurality of antennas to said second power amplifier by referencing a lookup table.

13. The outphasing transmitter of claim 5, wherein said outphasing transmitter dynamically assigns said second plurality of antennas to said second power amplifier in a random assignment.

14. The outphasing transmitter of claim 5, wherein said first decomposed RF signal and said second decomposed RF signal are constant amplitude signals.

15. The outphasing transmitter of claim 5, wherein said outphasing transmitter dynamically assigns said first plurality of antennas in a first non-overlapping sub-array and dynamically assigns said second plurality of antennas in a second non-overlapping sub-array.

16. The outphasing transmitter of claim 5, wherein said outphasing transmitter dynamically assigns said first plurality of antennas in a first group of interleaved antennas rows and dynamically assigns said second plurality of antennas in a second group of interleaved antennas rows.

* * * * *